United States Patent [19]

Pruett et al.

[11] Patent Number: 4,617,373

[45] Date of Patent: Oct. 14, 1986

[54] CONDENSATION POLYMERS AND PRODUCTS THEREFROM

[75] Inventors: Wayne P. Pruett; Richard H. S. Wang, both of Kingsport; Samuel D. Hilbert, Jonesborough; Max A. Weaver, Kingsport, all of Tenn.

[73] Assignee: Eastman Kodak Company, Rochester, N.Y.

[21] Appl. No.: 823,424

[22] Filed: Jan. 28, 1986

Related U.S. Application Data

[63] Continuation-in-part of Ser. No. 702,106, Feb. 15, 1985.

[51] Int. Cl.[4] .................. C08G 63/44; C08G 69/44; C08G 73/16
[52] U.S. Cl. ........................ 528/288; 528/289; 528/290; 528/291; 528/292; 528/345
[58] Field of Search ......... 528/288, 289, 345, 290–292

[56] References Cited

U.S. PATENT DOCUMENTS

| | | | |
|---|---|---|---|
| 4,297,502 | 10/1981 | Herrmann et al. | 528/288 |
| 4,359,570 | 11/1982 | Davis et al. | 528/289 |
| 4,377,669 | 3/1983 | Zweifel et al. | 525/445 |
| 4,400,500 | 8/1983 | Kelley et al. | 528/345 |

OTHER PUBLICATIONS

Hackh's Chemical Dictionary, Fourth Ed., McGraw-Hill, Inc., (1969) p. 424.

Primary Examiner—Lucille M. Phynes
Attorney, Agent, or Firm—Donald W. Spurrell; J. Frederick Thomsen

[57] ABSTRACT

Molding or fiber grade condensation polymer having copolymerized therein a total of from 1.0 to about 5,000 ppm of at least one methine moiety having one or more methine units defined as "the group $>C=C<$ conjoined with a conjugated aromatic system," said moiety absorbing in the range of from about 350 nm to about 650 nm, and being nonextractable from said polymer and stable under the polymer processing conditions. The moieties preferably have molecular weights of from about 200 to about 600 although lower and higher molecular weights are also operable and are derived from reactants (monomers) having one or more groups such as hydroxyl, carboxyl, carboxylic ester, acid halide, amino and the like which condense during condensation or polycondensation to enter the moiety into the polymer chain.

20 Claims, No Drawings

CONDENSATION POLYMERS AND PRODUCTS THEREFROM

This application is a continuation-in-part of Ser. No. 702,106, filed Feb. 15, 1985.

This invention concerns condensation polymers including polyester, polyamide and copolyesteramide types, wherein certain methine moieties have been copolymerized (condensation reacted) into the polymer to impart color and/or UV stability thereto. The methine moieties are thermally stable at the polymer processing (includes preparation) temperatures and are colorfast and nonextractable therefrom, rendering the polymers particularly suitable for use as beverage bottles and food, pharmaceutical and cosmetic containers. The methine moieties are useful in total concentration given herein in parts per million (ppm) ranging from about 1.0 to about 5,000, preferably 2.0 to about 1,500 (parts by weight of moiety per million parts by weight of final polymer).

The present polymers are linear, thermoplastic molding or fiber grade having an I.V. of from about 0.4 to about 1.2, and preferably are polyesters wherein the acid moiety is comprised of at least 50 mol % terephthalic acid residue, and the glycol moiety at least 50 mol % ethylene glycol or 1,4-cyclohexanedimethanol residue, and containing a total of from about 2 to 1,500 ppm of one or more of the methine moieties.

In accordance with the present invention, the methine moieties have at least one methine unit defined herein as "the group $>C\!=\!C<$ conjoined with a conjugated aromatic system." This unit imparts to the moiety and the polymer the property of ultraviolet or visible light absorption generally within the range of about 350 nm to about 650 nm. The moieties preferably have molecular weights of from about 200 to about 600 although lower and higher molecular weights are also operable and are derived from reactants (monomers) having one or more groups which condense during condensation or polycondensation to enter the moiety into the polymer chain. These groups include hydroxyl, carboxyl, carboxylic ester, acid halide, amino and the like. As aforesaid, these moieties are thermally stable at polymer processing conditions, which includes polycondensation temperatures of up to about 300° C. used, for example, in the preparation of polyesters such as poly(ethylene and terephthalate) and copolymers of poly(ethylene terephthalate) and poly(1,4-cyclohexylenedimethylene terephthalate). Of course, where only one condensable group is present, the methine monomer would act as a chain terminator in known manner.

The present invention is defined in its broad embodiment as a composition comprising molding or fiber grade condensation polymer having copolymerized therein a total of from 1.0 to about 5,000 ppm, of at least one methine moiety having one or more methine units, said moiety absorbing in the range of from about 350 nm to about 650 nm, and being nonextractable from said polymer and stable under the polymer processing conditions.

The nonextractabilities of the present methine moieties are determined as follows:

Extraction Procedure

All extractions are done in glass containers with distilled solvents under the time and temperature conditions described below. The sample form is $\frac{1}{2}$ inch×2$\frac{1}{2}$ inch segments cut from the cylindrical side wall portion of 2-liter bottles. All samples are washed with cold solvent to remove surface contaminants and are exposed using 200 ml. solvent/100 in.$^2$ surface area (2 ml/in.$^2$).

Solvent blanks are run under the same extraction conditions without polymer. In most cases samples were extracted, spiked, and analyzed in duplicates.

Extraction Conditions

1. Water. The samples at room temperature are added to solvent and heated at 250° F. for two hours. Half of the samples are then analyzed and the remainder are placed in a 120° F. oven for 30 days.

2. 50% Ethanol/Water. The samples at room temperature are added to the solvent at room temperature, placed in an oven at 120° F. and analyzed after 24 hours and 30 days.

3. Heptane. The samples at room temperature are added to solvent at room temperature and heated at 150° F. for 2 hours. Part of the samples are cooled to room temperature and analyzed spectrophotometrically and the remainder are allowed to age at 120° F. for 30 days before analysis.

4. Any suitable analytical technique and apparatus may be employed to determine the amount of methine moiety extracted from the polymer. The extractability of the present methine moieties from the present polymers was found to be essentially nonexistent.

Useful methine reactant compounds or monomers for the present invention have the general formulas:

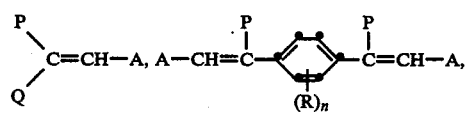

(shown in Table 12)

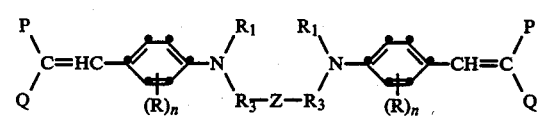

(shown in Table 2)

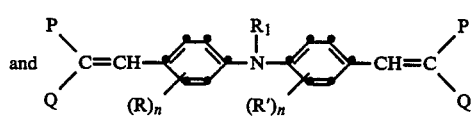

(Shown in Table 11)

wherein A is selected from the following radicals designated by their exemplary table numbers:

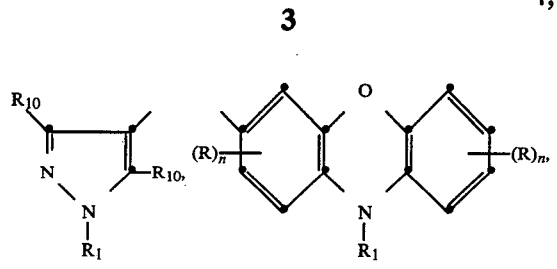
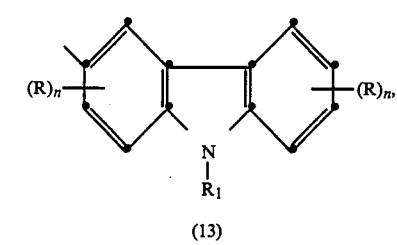
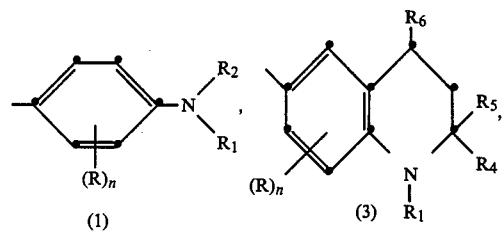
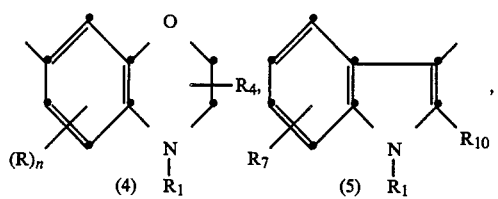
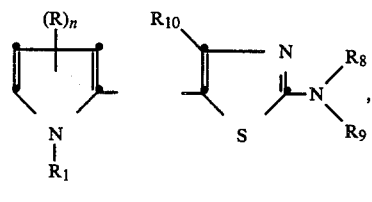
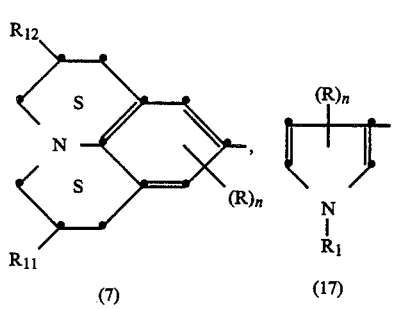
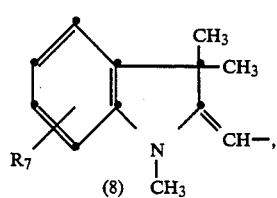

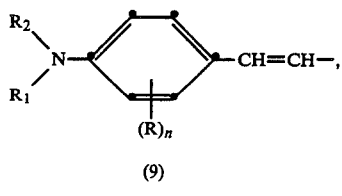
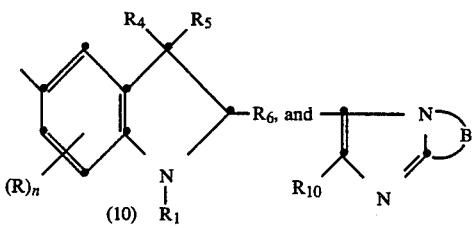

wherein:

R and R' are selected from hydrogen, fluorine, chlorine, bromine, alkyl, alkoxy, phenyl, phenoxy, alkylthio, and arylthio; n is 0, 1, 2;

$R_1$ and $R_2$ are selected from hydrogen; cycloalkyl; cycloalkyl substituted with one or two of alkyl, —OH, alkoxy, halogen, or hydroxy substituted alkyl; phenyl; phenyl substituted with alkyl, alkoxy, halogen, alkanoylamino, carboxy, cyano, or alkoxycarbonyl; straight or branched lower alkenyl; straight or branched alkyl of 1-8 carbons and such alkyl substituted with the following: hydroxy; halogen; cyano; succinimido; hydroxysuccinimido; acyloxysuccinimido; glutarimido; phenylcarbamoyloxy; phthalimido; 4-carboxyphthalimido; phthalimidino; 2-pyrrolidono; cyclohexyl; phenyl; phenyl substituted with alkyl, alkoxy, halogen, hydroxy alkanoylamino, carboxy, cyano, or alkoxycarbonyl; alkylsulfamoyl; vinylsulfonyl; acrylamido; sulfamyl; benzoylsulfonicimido; alkylsulfonamido; phenylsulfonamido; alkoxycarbonylamino; alkylcarbamoyloxy; alkoxycarbonyl; alkoxycarbonyloxy; alkenylcarbonylamino; groups of the formula

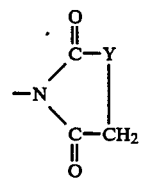

wherein Y is —NH—,

—O—, —S—, or —CH$_2$O—; —S—R$_{14}$; SO$_2$CH$_2$CH$_2$SR$_{14}$; wherein R$_{14}$ is alkyl, phenyl, phenyl substituted with halogen, alkyl, alkoxy, alkanoylamino, cyano, or alkoxycarbonyl; pyridyl; pyrimidinyl; benzoxazolyl; benzimidazolyl; benzothiazolyl; radicals of the formulae

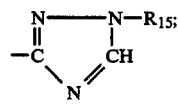

—OXR$_{16}$; —NHXR$_{16}$; —X—R$_{16}$; —CONR$_{15}$R$_{15}$; and —SO$_2$NR$_{15}$R$_{15}$; wherein R$_{15}$ is selected from H, aryl, alkyl, and alkyl substituted with halogen, —OH, phenoxy, aryl, —CN, cycloalkyl, alkylsulfonyl, alkylthio, alkanoyloxy, or alkoxy; X is —CO—, —COO—, or —SO$_2$—; R$_{16}$ is selected from alkyl and alkyl substituted with halogen, hydroxy, phenoxy, aryl, cyano, cycloalkyl, alkylsulfonyl, alkylthio, alkanoyloxy, and alkoxy; and when X is —CO—, R$_{16}$ also can be hydrogen, amino, alkenyl, alkylamino, dialkylamino, arylamino, aryl, or furyl; alkoxy; alkoxy substituted with hydroxy, cyano, alkanoyloxy, or alkoxy; phenoxy; phenoxy substituted with one or more of alkyl, carboxy, alkoxy, carbalkoxy, or halogen; R$_1$ and R$_2$ can be a single combined group such as pentamethylene, tetramethylene, ethyleneoxyethylene, ethylene sulfonylethylene, or

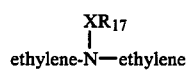

which, with the nitrogen to which it is attached, forms a ring; R$_{17}$ is alkyl, aryl, or cycloalkyl;

R$_3$ is alkylene, arylene, aralkylene, alkyleneoxy, or alkyleneoxyalkylene;

Z is a direct single bond, OCO, O, S, SO$_2$, R$_{17}$SO$_2$N=,

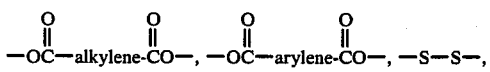

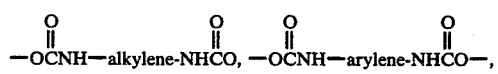

arylene, or alkylene;

R$_4$, R$_5$, and R$_6$ are each selected from hydrogen and alkyl;

R$_7$ is carboxy, carbalkoxy, or (R)$_n$;

R$_{10}$ is hydrogen, alkyl, and aryl;

R$_8$ and R$_9$ are selected from hydrogen and substituted or unsubstituted alkyl, aryl, or cycloalkyl;

R$_{11}$ and R$_{12}$ are hydrogen, alkyl, hydroxyl, or acyloxy;

B represents the atoms necessary to complete a five or six membered ring and is selected from

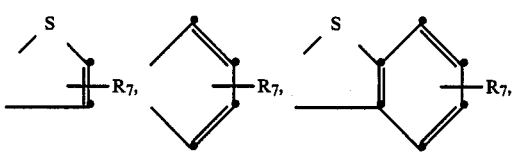

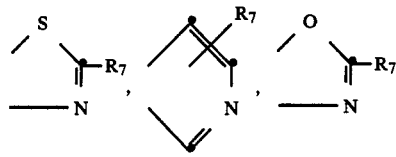

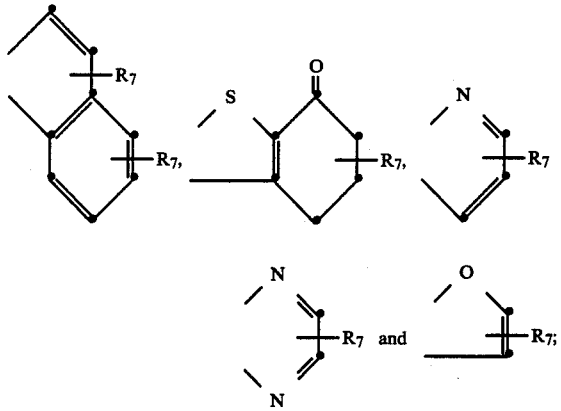

P and Q are selected from cyano, carbalkoxy, carbaryloxy, carbaralkyloxy, carbamyl, carboxy, N-alkylcarbamyl, N-alkyl-N-arylcarbamyl, N,N-dialkylcarbamyl, N-arylcarbamyl, N-cyclohexylcarbamyl, aryl, 2-benzoxazolyl, 2-benzothiazolyl, 2-benzimidazolyl, 1,3,4-thiadiazol-2-yl, 1,3,4-oxadiazol-2-yl, SO$_2$ alkyl, SO$_2$ aryl, and acyl, or P and Q may be combined as wherein R$_{17}$ is defined above and R$_{18}$ is CN, COOH, CO$_2$ alkyl, carbamyl, or N-alkylcarbamyl;

wherein at least one of A, P, and Q for each dye molecule must be or bear a condensable group selected from carboxy, carbalkoxy, carbaryloxy, N-alkylcarbamyloxy, acyloxy, chlorocarbonyl, carbamyloxy, N-(alkyl)$_2$carbamyloxy, amino, alkylamino, hydroxyl, N-phenylcarbamyloxy, cyclohexanoyloxy, and carbocyclohexyloxy; and wherein in the above definitions, each alkyl, aryl, or cycloalkyl moiety or portion of a group or radical may be substituted where appropriate with hydroxyl, acyloxy, alkyl, cyano, alkoxycarbonyl, halogen, alkoxy, or aryl, aryloxy, or cycloalkyl. Also in the above definitions, at least one of A, P, and Q for each dye molecule must be or bear a group capable of reacting under polymerization conditions, to incorporate the methine dye into the polymer, including the following: carboxy, carbalkoxy, carbaryloxy, N-alkylcarbamyloxy, acyloxy, chlorocarbonyl, carbamyloxy, N-alkylcarbamyloxy, amino, alkylamino, hydroxyl, N-phenylcarbamyloxy, cyclohexanoyloxy, and carbocyclohexyloxy, wherein the alkyl and/or aryl groups may contain common substituents such as hydroxyl, cyano, acyloxy, carbalkoxy, phenyl, and halogen which do not interface with the condensation reaction.

In all of the above definitions the alkyl or alkylene moieties or portions of the various groups contain from 1-8 carbons, straight or branched chain.

Advantages of these methine moieties over others which might be copolymerized into the polyester include (1) greater thermal stability—azo dyes, for example, are generally not stable to polymer preparation temperatures, (2) UV absorption characteristics—selected methine dyes absorb light at the proper wavelengths to protect contents of package, (3) UV stability—certain anthraquinone dyes, for example, which absorb light below 420 nm are generally not stable to UV, (4) high extinction coefficient—less dye needed to give equivalent color, and (5) low cost—generally methine dyes are much less costly than anthraquinones.

The types of polyesters useful in this invention are linear, thermoplastic, crystalline, or amorphous materials produced by conventional techniques using one or more diols and one or more dicarboxylic acids, copolymerized with the methine moieties. Typical of these polyesters are those disclosed, for example, in U.S. Pat. No. 4,359,570 incorporated herein by reference.

The diol components of the polyester are selected, for example, from ethylene glycol, 1,4-cyclohexanedimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-cyclohexanedimethanol, 1,3-cyclohexanedimethanol, X,8-bis(hydroxymethyl)tricyclo-[5.2.1.0]-decane wherein X represents 3, 4, or 5; and diols containing one or more oxygen atoms in the chain, e.g., diethylene glycol, triethylene glycol, dipropylene glycol, tripropylene glycol and the like. In general, these diols contain 2 to 18, preferably 2 to 12 carbon atoms. Cycloaliphatic diols can be employed in their cis or trans configuration or as mixtures of both The acid components (aliphatic, alicyclic, or aromatic dicarboxylic acids) of the polyester are selected, for example, from terephthalic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, and the like. In the polymer preparation, it is often preferable to use a functional acid derivative thereof such as the dimethyl, diethyl, or dipropyl ester of the dicarboxylic acid. The anhydrides of these acids also can be employed.

The preferred copolyesters are especially useful for making blow molded bottles or containers for beverages, and for molded food packages and the like. In this regard, certain of these copolyesters are color, I.V., and heat distortion or "hot fill" stable at temperatures of up to about 100° C., when properly heat set and molded articles therefrom exhibit good thin wall rigidity, excellent clarity and good barrier properties with respect to water and atmospheric gases, particularly carbon dioxide and oxygen.

In regard to products having the "hot fill" stability, the most preferred polyesters therefor comprise poly(ethylene terephthalate) and this polymer modified with up to about 5 mole % of 1,4-cyclohexanedimethanol, wherein the polymers have been sufficiently heat set and oriented by methods well known in the art to give a desired degree of crystallinity. By definition, a polymer is "hot fill" stable at a prescribed temperature when less than 2% change in volume of a container manufactured therefrom occurs upon filling the same with a liquid at that temperature. For the particular application of blow-molded beverage bottles, these most preferred polyesters have an I.V. of 0.65 to 0.85, and a Tg of >70° C., and film sections cut from the bottle have a Water Vapor Transmission Rate of 1.5 to 2.5 g. mils/100 in.$^2$-24 hrs., a $CO_2$ Permeability of 20–20 cc. mils/100 in.$^2$-24 hrs.-atm., and an $O_2$ Permeability of 4–8 cc. mils/100 in.$^2$-24 hrs.-atm. The Tg is determined by Differential Scanning Calorimetry at a scan rate of 20 Centigrade Degrees/min., the $O_2$ Permeability by the standard operating procedure of a MOCON OXTRAN 100 instrument of Modern Controls, Inc., of Elk River, Minn., and the $CO_2$ Permeability by the standard operating procedure of a MOCON PERMATRAN C II, also of Modern Controls.

In general, any polyamide or copolyesteramide may be used in accordance with the present invention, typical of which are those disclosed in U.S. Pat. Nos. 3,562,206; 4,252,920; 4,237,251; 4,438,240; 4,420,603; 4,420,602; 4,436,898; 4,436,972; 4,251,653; 3,560,448; and the multitude of references cited in each, all incorporated herein by reference. The following example typifies the preparation of polyamide material containing the present methine moieties.

Preparation of Poly(hexamethylenedipamide) Copolymerized With a Methine Colorant 73 Grams (0.5 mol) adipic acid, 82.77 g. of an aqueous solution of 58.01 g. (0.5001 mol) hexamethylenediamine, and 0.0226 g. (200 ppm) (0.0001 mol) of

are added into a 500 ml., single-necked, round-bottom flask equipped with a nitrogen inlet, stirrer, vacuum outlet, and condensing flask. The flask is placed in a 100° C. Belmont metal bath and a sweep of nitrogen provided over the reaction mixture. The temperature of the bath is raised to 215° C. over a 45-minute time period, held at 215° C. for 20 minutes, raised to 285° C., and held at 285° C. for 30 minutes. Vacuum of 0.3 to 0.5 mm Hg. is then applied to the flask and the 285° C. temperature maintained for 38 minutes. The flask is removed from the metal bath and allowed to cool, maintaining a nitrogen atmosphere therein while the polyamide crystallizes. The resulting polymer is yellow in color, has an I.V. of 0.63 measured in a 60/40 ratio by wt. of phenol/tetrachloroethane at a polymer concentration of 0.5 g./100 ml. solvent, and has a melting point of 264° C. A UV visible spectrum on film of the polymer shows a strong absorption at 420 nm.

Practice of the Invention

In general, the methine reactant compounds (monomers) are prepared, for example, by reacting the hydrogenated parent of an aromatic moiety A above, which is electron rich, with a Vilsmeier complex to product an aldehyde [Bull. Societe Chim. de France, No. 10:1898-99 (October 1962); Angewandte Chemie 72, No. 22, 836-845, Nov. 21, 1960]. For reasons of cost and convenience, phosphorus oxychloride (POCl₃) and N,N-dimethylformamide (DMF) are the preferred reagents. Thus, aromatic amines such as anilines, m-toluidines, 2,5-dimethylanilines, 2,5-dimethoxyanilines, or the like are converted in high yields into the corresponding aldehydes via the Vilsmeier reaction, which aldehydes are subsequently reacted with an active methylene

in the presence of a base, such as piperidine to produce the methine monomers, as shown in the following reaction sequence

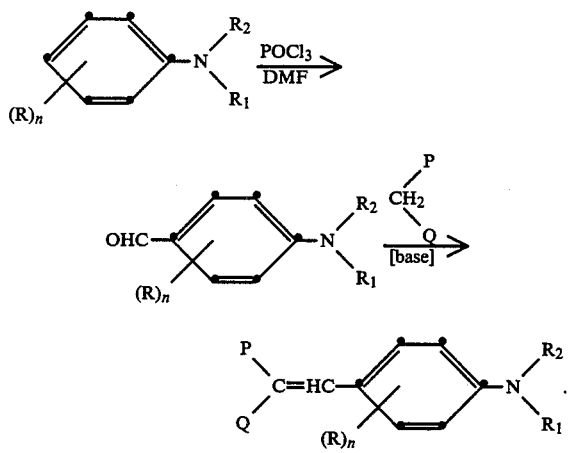

Tetrahydroquinolines, benzomorpholines, indoles, thiazoles, and Fischer's base also undergo the Vilsmeier reaction to produce aldehydes. Preparation of the methine monomers and intermediate aldehydes via the above route is disclosed in considerable detail in many patents including: Nos. U.S. 2,649,471; U.S. 2,850,520; U.S. 3,247,211; U.S. 3,260,737; U.S. 3,326,960; U.S. 3,349,098; U.S. 3,386,491; U.S. 3,390,168; U.S. 3,453,270; U.S. 3,453,280; U.S. 3,468,619; U.S. 3,504,010; U.S. 3,555,016; U.S. 3,597,434; U.S. 3,652,636; U.S. 3,661,899; U.S. 3,728,374; U.S. 3,787,476; U.S. 3,829,410; U.S. 3,829,461; U.S. 3,846,069; U.S. 3,869,495; U.S. 3,869,498; U.S. 3,879,434; U.S. 3,920,719; and U.S. 4,077,962. It is also known that it is not necessary to isolate the intermediate aldehyde before preparing the methine monomers as the Vilsmeier reaction mixture can be reacted directly to produce the desired product (U.S. Pat. Nos. 3,917,604 and 4,088,673). All of these patent teachings are incorporated herein by reference.

Since the Vilsmeier complexes also convert hydroxyl groups to halogen, other methods must be employed to prepare methine monomers bearing hydroxyl groups. For example, the monomers can be prepared according to the scheme

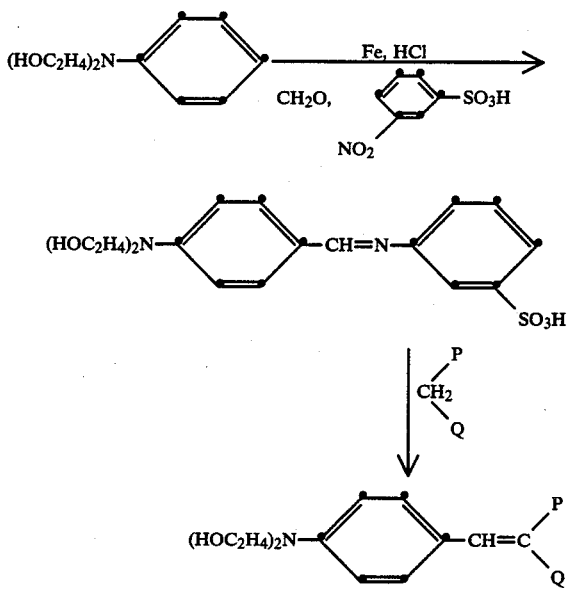

comprising reacting N,N-di-β-hydroxyethylaniline with formaldehyde and m-nitrobenzenesulfonic acid in the presence of concentrated HCl and iron filings to produce the intermediate 4'-(di-β-hydroxyethylamino)-benzalaniline-m-sulfonic acid, which can be reacted with active methylenes to product the monomers (U.S. Pat. No. 2,583,551).

Another method for producing methine monomers containing dicyanovinyl groups is described in U.S. Pat. No. 4,006,178 wherein aromatic amines are reacted with 1-halogeno-2,2-dicyanoethylene to produce corresponding methine compounds as follows:

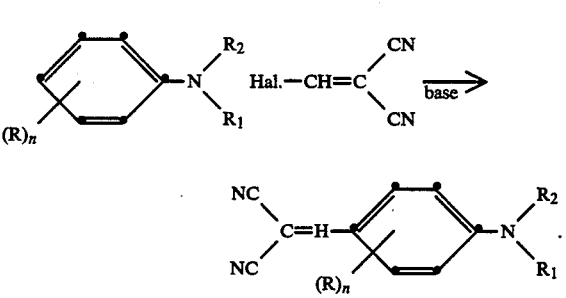

Of course, intermediate aldehyde compounds containing groups such as acyloxy or alkoxycarbonyl can be hydrolyzed to prepare methine monomers containing hydroxyl or carboxy groups, respectively, which are capable of being polymerized into the condensation polymer.

The following examles will illustrate the common reaction of an aromatic aldehyde with an active methylene to produce a typical methine monomer.

EXAMPLE 1

4-(N,N-Dimethylamino)cinnamaldehyde (1.75 g, 0.01 m), methyl cyanoacetate (0.99 g, 0.01 m), methanol (20 mL), and piperidine (3 drops) are mixed and heated together at reflux for 30 minutes. After being allowed to cool, the reaction mixture is filtered. The orange dye (2.5 g) is washed with methanol and air-dried and has the following structure.

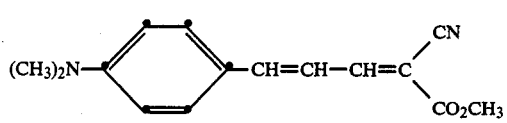

This yellow dye absorbs light at $\lambda_{max}$ 464 nm with a molar extinction coefficient of 38,000.

EXAMPLE 2

Ethyl [[4-(dimethylamino)phenyl]methylene]propenedioate shown below is prepared by the reaction of 4-(dimethylamino)benzaldehyde with diethyl malonate in the presence of a base catalyst in toluene. This pale yellow dye absorbs UV light at $\lambda_{max}$ 373 nm with a molar extinction coefficient of 33,000.

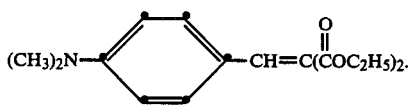

The following tables exemplifying the useful methine reactants further illustrate the invention.

TABLE 1

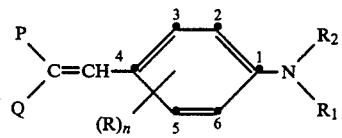

| Example No. | $(R)_n$ | $R_1$ | $R_2$ | P,Q |
|---|---|---|---|---|
| 3 | H | $CH_2CH_2OH$ | $CH_2CH_2OH$ | CN, CN |
| 4 | H | $CH_2CH_2OH$ | $CH_2CH_2OH$ | CN, $SO_2CH_3$ |
| 5 | 3-$CH_3$ | $CH_2CH_2OH$ | $CH_2CH_2OH$ | CN, $CONHC_6H_5$ |
| 6 | 3-$CH_3$ | $CH_2CH_2OH$ | $CH_2CH_2OH$ | CN, $SO_2CH_3$ |
| 7 | H | $CH_2CH_2OH$ | $CH_2CH_2OH$ | CN, $COC_6H_5$ |
| 8 | H | $CH_2CH_2OH$ | $CH_2CH_2OH$ | CN, -C(=N-benzoxazole) |
| 9 | 3-$CH_3$ | $CH_2CH(OH)CH_3$ | $C_2H_5$ | CN, $CO_2CH_3$ |
| 10 | 2,5-di-$OCH_3$ | $CH_2CH(OH)CH_2OH$ | $C_2H_5$ | CN, $CONH_2$ |
| 11 | 2-$OCH_3$, 5-$CH_3$ | $C_2H_5$ | $C_2H_5$ | CN, $CO_2C_2H_5$ |
| 12 | 2-$OCH_3$, 5-Cl | $C_2H_5$ | $C_2H_5$ | CN, $CO_2C_6H_5$ |
| 13 | 2-$SCH_3$ | $C_2H_5$ | $C_2H_5$ | CN, $CO_2C_6H_{11}$ |
| 14 | 2-$OC_6H_5$ | $C_2H_5$ | $C_2H_5$ | CN, $CONHC_2H_4OH$ |
| 15 | H | $C_2H_4OCOCH_3$ | $C_2H_5$ | CN, $CO_2CH_3$ |
| 16 | H | $C_2H_4OCOCH_3$ | $C_2H_4OCOCH_3$ | CN, CN |
| 17 | 3-$CH_3$ | $C_2H_4OCOCH_3$ | $C_2H_4OCOCH_3$ | CN, $CO_2CH_3$ |
| 18 | 3-$CH_3$ | $C_2H_4OCOCH_3$ | $C_2H_4OCOCH_3$ | $CO_2C_2H_5$, $CO_2C_2H_5$ |
| 19 | H | $C_2H_4OCOCH_3$ | $C_2H_4OCOCH_3$ | phthalimide |

TABLE 1-continued

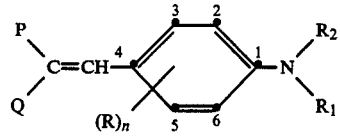

| Example No. | (R)$_n$ | R$_1$ | R$_2$ | P,Q |
|---|---|---|---|---|
| 20 | H | C$_2$H$_4$OCOCH$_3$ | C$_2$H$_4$OCOCH$_3$ | 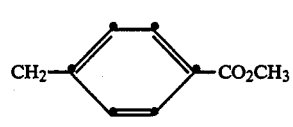 |
| 21 | H | C$_2$H$_4$OCOCH$_3$ | C$_2$H$_5$ | 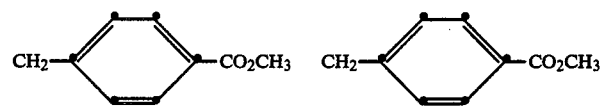 |
| 22 | H | CH$_3$ | CH$_3$ | 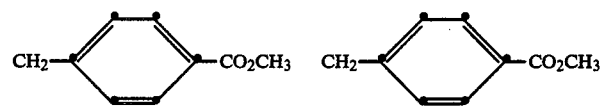 |
| 23 | H | C$_6$H$_5$ | CH$_2$CH$_2$OCOCH$_3$ | CN, CO$_2$CH$_3$ |
| 24 | 3-CH$_3$ | C$_6$H$_5$ | CH$_2$CH$_2$OCOCH$_3$ | CN, COOH |
| 25 | 3-OC$_2$H$_4$OCOCH$_3$ | p-CH$_3$C$_6$H$_4$ | CH$_2$CH$_2$OCOCH$_3$ | CN, CO$_2$CH$_2$CH$_2$CH$_2$CH$_3$ |
| 26 | 3-CH$_3$ | m-ClC$_6$H$_4$ | CH$_2$CH$_2$OH | CN, CO$_2$CH$_3$ |
| 27 | H | CH$_2$C$_6$H$_5$ | CH$_2$C$_6$H$_5$ | CN, CO$_2$CH$_3$ |
| 28 | 3-CH$_3$ | CH$_2$C$_6$H$_5$ | CH$_2$-C$_6$H$_4$-CO$_2$CH$_3$ | CN, CN |
| 29 | 3-CH$_3$ | CH$_2$-C$_6$H$_4$-CO$_2$CH$_3$ | CH$_2$-C$_6$H$_4$-CO$_2$CH$_3$ | CN, COC(CH$_3$)$_3$ |
| 30 | 3-CH$_3$ | CH$_2$-C$_6$H$_4$-Cl | CH$_2$CH$_2$OCOCH$_3$ | CN, CO$_2$CH$_3$ |
| 31 | 3-CH$_3$ | CH$_2$-C$_6$H$_4$-OCH$_3$ | CH$_2$CH$_2$OCOC$_6$H$_5$ | CN, CO$_2$CH$_2$CH$_2$OCH$_3$ |
| 32 | 3-CH$_3$ | CH$_2$CH$_2$OCOC$_6$H$_5$ | C$_2$H$_5$ | CN, CO$_2$CH$_3$ |
| 33 | 3-CH$_3$ | CH$_2$CH$_2$OCONHC$_6$H$_5$ | C$_2$H$_5$ | CN, CO$_2$CH$_3$ |
| 34 | H | C$_6$H$_5$ | C$_6$H$_5$ | CN, CO$_2$CH$_3$ |
| 35 | 3-CH$_3$ | CH$_2$CH$_2$CN | C$_2$H$_5$ | CN, CO$_2$CH$_3$ |

TABLE 1-continued

Structure: P,Q-C=CH-[phenyl ring with positions 2,3 at top and 5,6 at bottom, position 4 attached to C=CH, position 1 attached to N(R1)(R2), (R)n substituent]

| Example No. | (R)$_n$ | R$_1$ | R$_2$ | P,Q |
|---|---|---|---|---|
| 36 | H | CH$_2$CH$_2$CO$_2$CH$_3$ | CH$_2$CH$_2$CO$_2$CH$_3$ | phthaloyl (benzene ring with two C=O groups) |
| 37 | H | CH$_2$CH$_2$CO$_2$H | CH$_2$CH$_2$CO$_2$H | CN, CN |
| 38 | H | CH$_2$CH$_2$C$_6$H$_5$ | CH$_2$CH$_2$OH | CN, CONHC$_4$H$_9$—n |
| 39 | H | CH$_2$CH$_2$Cl | CH$_2$CN | CN, CO$_2$CH$_3$ |
| 40 | H | CH$_2$—(C$_6$H$_4$)—COOH | CH$_2$—(C$_6$H$_4$)—COOH | CN, CN |
| 41 | H | CH$_2$—(C$_6$H$_4$)—COCl | CH$_2$—(C$_6$H$_4$)—COCl | CN, CN |
| 42 | H | —CH$_2$CH$_2$SO$_2$CH$_2$CH$_2$— | | CN, CO$_2$CH$_3$ |
| 43 | H | —CH$_2$CH$_2$N(SO$_2$CH$_3$)CH$_2$CH$_2$— | | CN, CO$_2$CH$_3$ |
| 44 | 3-CH$_3$ | —CH$_2$CH$_2$—OCH$_2$CH$_2$— | | CN, CO$_2$CH$_3$ |
| 45 | H | —CH$_2$CH$_2$CH$_2$CH$_2$CH$_2$— | | CN, CO$_2$CH$_3$ |
| 46 | 3-CH$_3$ | C$_2$H$_5$ | —CH$_2$CH$_2$N(phthalimido) | CN, CO$_2$CH$_3$ |
| 47 | 3-CH$_3$ | C$_2$H$_5$ | —CH$_2$CH$_2$N(phthalimido-COOH) | CN, CO$_2$CH$_3$ |
| 48 | 3-CH$_3$ | C$_2$H$_5$ | —CH$_2$CH$_2$N(C$_6$H$_5$)SO$_2$CH$_3$ | CN, CO$_2$CH$_3$ |
| 49 | 3-CH$_3$ | C$_2$H$_5$ | —CH$_2$CH$_2$OC$_6$H$_5$ | CN, CO$_2$CH$_3$ |
| 50 | 3-CH$_3$ | C$_2$H$_5$ | CH$_2$CH$_2$N(CO—CH$_2$—CO—CH$_2$) (succinimido) | CN, CO$_2$CH$_3$ |
| 51 | H | CH$_2$CH$_2$OC$_2$H$_5$ | CH$_2$CH$_2$OC$_2$H$_5$ | CN, CO$_2$CH$_3$ |
| 52 | 3-CH$_3$ | CH$_2$CH$_3$ | CH$_2$CH$_2$OCH$_2$CH$_2$OC$_2$H$_5$ | CN, CO$_2$CH$_3$ |
| 53 | 3-CH$_3$ | CH$_2$CH$_3$ | CH$_2$CH$_2$N(COCH—OH, COCH$_2$) | CN, CO$_2$CH$_3$ |

TABLE 1-continued

Structure:
P\
 C=CH—[benzene ring with positions 1-6, (R)n at position 5, position 1 has N(R1)(R2), position 4 has the C=CH group]
Q/

| Example No. | (R)n | R₁ | R₂ | P,Q |
|---|---|---|---|---|
| 54 | 3-$CH_3$ | $CH_2CH_3$ | $CH_2CH_2N\begin{smallmatrix}COCH-OCCH_3\\\ \ \ \ \ \ \ \ \ \ \ \ \ \|\\\ \ \ \ \ \ \ \ \ \ \ \ \ O\\COCH_2\end{smallmatrix}$ (ring with COCH-OCOCH₃ and COCH₂) | CN, $CO_2CH_3$ |
| 55 | 3-$CH_3$ | $CH_3$ | $CH_2CH_2N$(ring: COCH₂—CH₂CH₂) | CN, $CO_2CH_3$ |
| 56 | 3-$CH_3$ | $CH_2C_6H_5$ | $CH_2CH_2N$(CO—benzo ring—CH₂) (phthalimide-like benzo-fused) | CN, $CO_2CH_3$ |
| 57 | H | $CH_2C_6H_{11}$ | $C_2H_5$ | CN, $CO_2CH_3$ |
| 58 | 3-$CH_3$ | $C_2H_5$ | $CH_2CH_2CH_2SO_2CH_3$ | CN, $CO_2CH_3$ |
| 59 | 3-$CH_3$ | $C_2H_5$ | $CH_2CH_2OCOC_2H_5$ | CN, $CO_2CH_3$ |
| 60 | 3-$CH_3$ | $-CH_2CH=CH_2$ | $-CH_2CH=CH_2$ | CN, $CO_2CH_3$ |
| 61 | 3-$CH_3$ | $-C_2H_5$ | $-CH_2CH_2N$(ring: CONH—CO—CH₂) | CN, COOH |
| 62 | 3-$CH_3$ | $-C_2H_5$ | $-CH_2CH_2N$(ring: COS—CO—CH₂) | CN, $CO_2CH(CH_3)_2$ |
| 63 | 3-$CH_3$ | $-C_2H_5$ | $CH_2CH_2N$(ring: CO—benzo—$SO_2$) (saccharin-like) | $CO_2CH_3$, $CO_2CH_3$ |
| 64 | 3-$CH_3$ | $-C_2H_5$ | $-CH_2CH_2N$(ring: CO—CH₂—O—COCH₂) | $CO_2CH_3$, CN |
| 65 | 3-$CH_3$ | $-C_2H_5$ | $-CH_2CH_2SO_2CH=CH_2$ | $CO_2CH_3$, CN |
| 66 | 3-$CH_3$ | $-C_2H_5$ | $-CH_2CH_2SO_2CH_2CH_2SC_6H_5$ | $CO_2CH_3$, CN |
| 67 | 3-$CH_3$ | $-C_2H_5$ | $-CH_2CH_2S-C_6H_4-Cl$ | $CO_2CH_3$, CN |
| 68 | 3-$CH_3$ | $-C_2H_5$ | $-CH_2CH_2SC_4H_9n$ | $CO_2CH_3$, CN |
| 69 | 3-$CH_3$ | $-C_2H_5$ | $-CH_2CH_2N(C_2H_4CN)SO_2CH_3$ | $CO_2CH_3$, CN |
| 70 | 3-$CH_3$ | $-C_2H_5$ | $-CH_2CH_2CONH_2$ | $CO_2CH_3$, CN |
| 71 | 3-$CH_3$ | $-C_2H_5$ | $-CH_2CH_2CON(C_2H_5)_2$ | $CO_2CH_3$, CN |

TABLE 1-continued $$\underset{(R)_n}{\overset{P}{\underset{Q}{C}}=CH-\underset{5}{\overset{3}{\underset{6}{\bigcirc}}}\overset{2}{\underset{1}{\bigcirc}}N\overset{R_2}{\underset{R_1}{}}}$$

| Example No. | (R)$_n$ | R$_1$ | R$_2$ | P,Q |
|---|---|---|---|---|
| 72 | 3-CH$_3$ | —C$_2$H$_5$ | —CH$_2$CH(OCOCH$_3$)CH$_2$OCOCH$_3$ | CN, CN |
| 73 | 3-CH$_3$ | —C$_2$H$_5$ | —CH$_2$CH$_2$OCOC$_6$H$_5$ | CN, CN |
| 74 | 3-CH$_3$ | —C$_2$H$_5$ | —CH$_2$CH$_2$OCOC$_6$H$_{11}$ | CN, CN |
| 75 | 3-CH$_3$ | —C$_2$H$_5$ | —CH$_2$CH$_2$SO$_2$N(C$_2$H$_5$)$_2$ | CN, CO$_2$CH$_3$ |
| 76 | 3-CH$_3$ | —C$_2$H$_5$ | —CH$_2$CH$_2$SO$_2$N(CH$_3$)C$_6$H$_5$ | CN, CO$_2$CH$_3$ |
| 77 | 3-CH$_3$ | —C$_2$H$_5$ | —CH$_2$CHS$_2$—C(1,2,4-triazol-3-yl, NH) | CN, CO$_2$CH$_3$ |
| 78 | 3-CH$_3$ | —C$_2$H$_5$ | —CH$_2$CH$_2$—S—C(1,2,4-triazol-3-yl, N—C$_2$H$_4$OH) | CN, CO$_2$CH$_2$C$_6$H$_5$ |
| 79 | 3-CH$_3$ | —C$_2$H$_5$ | —CH$_2$CH$_2$S—C(benzothiazol-2-yl) | CN, CO$_2$CH$_3$ |
| 80 | 3-CH$_3$ | —C$_2$H$_5$ | —CH$_2$CH$_2$SO$_2$—(3,4-dichlorophenyl) | CN, CO$_2$CH$_3$ |
| 81 | 3-CH$_3$ | —C$_2$H$_5$ | —CH$_2$CH$_2$S—C(benzoxazol-2-yl) | CN, CO$_2$CH$_3$ |
| 82 | 3-CH$_3$ | —C$_2$H$_5$ | —CH$_2$CH$_2$S—C(pyrazin-2-yl) | CN, CO$_2$CH$_3$ |
| 83 | 3-CH$_3$ | —C$_2$H$_5$ | —CH(CH$_3$)CH$_2$CO$_2$CH$_3$ | CN, CO$_2$CH$_3$ |
| 84 | 3-CH$_3$ | —C$_2$H$_5$ | —CH(CH$_3$)CH$_2$CO$_2$C$_2$H$_5$ | CN, C(benzimidazol-2-yl) |

TABLE 1-continued

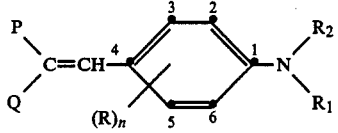

| Example No. | (R)n | R₁ | R₂ | P,Q |
|---|---|---|---|---|
| 85 | 3-CH₃ | —C₂H₅ | —CH₂CH₂OCH₂CH₂OH | CN, $\underset{\underset{O}{\diagdown\diagup}}{N=C}$—C₆H₅ (1,3,4-oxadiazole with CN and C₆H₅) |
| 86 | 3-CH₃ | —C₂H₅ | —CH₂CH₂OC(O)CH₂C₆H₅ | CN, CONH—⟨S⟩ |
| 87 | 3-CH₃ | —C₂H₅ | —CH₂CH₂OC(O)CH₂OC₆H₅ | CN, CO₂CH₃ |
| 88 | 3-CH₃ | —C₂H₅ | —CH₂CH(C₆H₅)OC(O)CH₃ | C₆H₅, CN |
| 89 | 3-CH₃ | —C₂H₅ | —CH₂CH(OCOCH₃)CH₂Cl | CO₂CH₃, CN |
| 90 | 3-CH₃ | —C₂H₅ | —CH₂CH₂OC(O)CH₂Cl | CO₂CH₃, CN |
| 91 | 3-CH₃ | —C₂H₅ | —CH₂CH₂OC(O)CH₂OCH₃ | CO₂CH₃, CN |

TABLE 2

$$\left\{\begin{matrix}P\\Q\end{matrix}C=CH-\underset{(R)_n}{\overset{3\ 2}{\underset{5\ 6}{\bigcirc}}}-N\begin{matrix}R_1\\R_3\end{matrix}\right\}_2 Z$$

| Example No. | (R)n | R₁ | R₃ | Z | P, Q |
|---|---|---|---|---|---|
| 92 | H | C₂H₅ | —CH₂CH₂— | —SO₂— | CN, CO₂CH₃ |
| 93 | 3-CH₃ | C₂H₅ | —CH₂CH₂— | —SO₂— | CN, CO₂CH₃ |
| 94 | 3-CH₃ | C₂H₅ | —CH₂CH₂— | —O— | CN, CO₂CH₃ |
| 95 | 3-CH₃ | C₂H₅ | —CH₂CH₂O— | —CH₂CH₂— | CN, CO₂CH₃ |
| 96 | 3-CH₃ | C₂H₅ | —CH₂CH₂— | —OC(O)— | CN, CO₂CH₃ |
| 97 | 3-CH₃ | C₂H₅ | —CH₂— | —⟨C₆H₄⟩— | CN, CO₂CH₃ |
| 98 | 3-CH₃ | C₂H₅ | —CH₂CH₂— | —S—S— | CN, CO₂CH₃ |
| 99 | 3-CH₃ | C₂H₅ | —CH₂CH₂— | —OC(O)CH₂CH₂C(O)O— | CN, CO₂CH₃ |

TABLE 2-continued $$\left\{\begin{matrix}P\\ \\Q\end{matrix}C=CH-\underset{(R)_n}{\overset{3\quad 2}{\underset{5\quad 6}{\bigcirc}}}-N\begin{matrix}R_1\\ \\R_3\end{matrix}\right\}_2 Z$$

| Example No. | $(R)_n$ | $R_1$ | $R_3$ | Z | P, Q |
|---|---|---|---|---|---|
| 100 | 3-CH$_3$ | C$_2$H$_5$ | —CH$_2$CH$_2$— | —OC(CH$_2$)$_4$CO— | CN, CO$_2$CH$_3$ |
| 101 | 3-CH$_3$ | C$_2$H$_5$ | —CH$_2$CH$_2$— | —NHC(CH$_2$)$_6$CNH— | CN, CO$_2$CH$_3$ |
| 102 | 3-CH$_3$ | C$_2$H$_5$ | —CH$_2$CH$_2$— | —CNH—(benzene with CH$_3$)—NHC— | CN, CO$_2$CH$_3$ |
| 103 | 3-CH$_3$ | C$_2$H$_5$ | —CH$_2$CH$_2$— | —OC—(p-phenylene)—CO— | CN, CO$_2$CH$_3$ |
| 104 | H | C$_2$H$_5$ | —CH$_2$CH$_2$— | —OC—(m-phenylene)—CO— | CN, CO$_2$CH$_3$ |
| 105 | H | CH$_2$CH$_2$CN | —CH$_2$CH$_2$— | —OCO— | CN, CO$_2$CH$_3$ |
| 106 | H | CH$_2$CH$_2$CN | —CH$_2$CH$_2$— | —OC— | CN, CO$_2$CH$_3$ |
| 107 | H | CH$_2$CH$_2$CN | —CH$_2$CH$_2$— | —OC(CH$_2$)$_4$CO— | CN, CN |
| 108 | H | CH$_2$CH$_2$CN | —CH$_2$CH$_2$OCH$_2$CH$_2$— | —OC—(p-phenylene)—CO— | CN, CN |
| 109 | H | CH$_2$CH$_2$CN | —CH$_2$CH$_2$— | —OC—(p-phenylene)—CO— | CN, SO$_2$CH$_3$ |
| 110 | H | CH$_2$CH$_2$CN | —CH$_2$CH$_2$— | —OC—(p-phenylene)—CO— | CN, SO$_2$C$_6$H$_5$ |
| 111 | H | CH$_2$CH$_2$OCCH$_3$ (O) | —CH$_2$CH$_2$— | —OC—(p-phenylene)—CO— | CN, CONHC$_6$H$_5$ |

TABLE 2-continued $$\left\{\begin{matrix}P\\Q\end{matrix}C=CH-\underset{(R)_n}{\overset{3}{\underset{5}{\bigcirc}}}\overset{2}{\underset{6}{\bigcirc}}\overset{1}{N}\overset{R_1}{\underset{R_3}{\bigg\}}}\right\}_2 Z$$

| Example No. | (R)$_n$ | R$_1$ | R$_3$ | Z | P, Q |
|---|---|---|---|---|---|
| 112 | 2,5-diOCH$_3$ | C$_2$H$_5$ | —CH$_2$CH$_2$— | —OC(=O)-C$_6$H$_4$-C(=O)O— (terephthaloyl) | phthaloyl (1,2-benzenedicarbonyl) |
| 113 | 3-Cl | C$_2$H$_5$ | —CH$_2$CH$_2$— | —S— | CN, CO$_2$C$_6$H$_5$ |
| 114 | 2-OCH$_3$, 5-Cl | C$_2$H$_5$ | —CH$_2$CH$_2$— | —OCCH$_2$CH$_2$CH$_2$CO— (glutaroyl dioxy) | CN, CO$_2$C$_2$H$_4$CN |
| 115 | 3-CH$_3$ | C$_6$H$_5$ | —CH$_2$CH$_2$— | —OCCH$_2$CH$_2$CH$_2$CO— | CN, CO$_2$CH$_3$ |
| 116 | 3-CH$_3$ | C$_6$H$_{11}$ | —CH$_2$CH(CH$_3$)— | —OCCH$_2$CH$_2$CH$_2$CO— | CN, CO$_2$CH$_3$ |
| 117 | 3-CH$_3$ | CH$_2$CH$_2$C$_6$H$_5$ | —CH$_2$— | phenylene (C$_6$H$_4$) | CN, CO$_2$CH$_3$ |
| 118 | 3-CH$_3$ | CH$_2$CH$_2$OC$_2$H$_5$ | —CH$_2$CH$_2$CH$_2$— | —OC-C$_6$H$_4$-CO— (terephthaloyl) | CN, CO$_2$CH$_3$ |
| 119 | 3-CH$_3$ | CH$_2$CH$_2$OC$_6$H$_5$ | —CH$_2$CH$_2$CH$_2$CH$_2$— | —OC-C$_6$H$_4$-CO— | CN, CO$_2$CH$_3$ |
| 120 | 3-CH$_3$ | CH$_2$CH$_2$N(COCH$_2$)$_2$ | —CH$_2$CH$_2$— | —OC-C$_6$H$_4$-CO— | CN, benzoxazol-2-yl |
| 121 | 3-CH$_3$ | CH$_2$CH$_2$CH$_2$CH$_3$ | —CH$_2$CH$_2$— | —OC-C$_6$H$_4$-CO— | CN, benzimidazol-2-yl |
| 122 | 3-CH$_3$ | CH$_2$CH$_2$OH | —CH$_2$CH$_2$— | —SO$_2$— | CN, CN |
| 123 | 3-CH$_3$ | CH$_2$CH$_2$CO$_2$CH$_3$ | —CH$_2$CH$_2$— | —SO$_2$— | CN, CN |
| 124 | 3-CH$_3$ | CH$_2$CH$_2$Cl | —CH$_2$CH$_2$— | —OC(CH$_2$)$_4$CO— | CN, CO$_2$CH$_3$ |

TABLE 2-continued

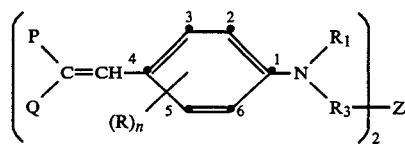

| Example No. | (R)$_n$ | R$_1$ | R$_3$ | Z | P, Q |
|---|---|---|---|---|---|
| 125 | 3-CH$_3$ | C$_2$H$_5$ | —CH$_2$CH$_2$— | single bond | —OC(O)—C(CN)=C—C$_6$H$_5$ |
| 126 | 3-CH$_3$ | C$_2$H$_5$ | —CH$_2$CH$_2$— | —OC(O)(CH$_2$)$_4$CO— | —OC(O)—C(CN)=C—C$_6$H$_5$ |
| 127 | 3-CH$_3$ | C$_2$H$_5$ | —CH$_2$CH$_2$— | —OC(O)(CH$_2$)$_4$CO— | CO$_2$C$_2$H$_5$, CO$_2$C$_2$H$_5$ |
| 128 | 3-CH$_3$ | C$_2$H$_5$ | —CH$_2$CH$_2$— | —OC(O)(CH$_2$)$_4$CO— | CO$_2$C$_2$H$_5$, SO$_2$CH$_3$ |
| 129 | 3-CH$_3$ | C$_2$H$_5$ | —CH$_2$CH$_2$— | —OC(O)(CH$_2$)$_4$CO— | CN, C$_6$H$_5$ |
| 130 | 3-CH$_3$ | CH(CH$_3$)CH$_2$CO$_2$CH$_3$ | —CH$_2$CH$_2$— | —OC(O)(CH$_2$)$_4$CO— | CN, CONH$_2$ |
| 131 | 3-CH$_3$ | C$_2$H$_5$ | —CH$_2$CH$_2$— | —OC(O)(CH$_2$)$_4$CO— | COC$_6$H$_5$, COC$_6$H$_5$ |
| 132 | 3-CH$_3$ | C$_2$H$_5$ | —CH$_2$CH$_2$— | —OC(O)(CH$_2$)$_4$CO— | CO$_2$C$_6$H$_5$, CO$_2$C$_6$H$_5$ |
| 133 | 3-CH$_3$ | C$_2$H$_5$ | —CH$_2$CH$_2$— | —OC(O)(CH$_2$)$_4$CO— | CN, CONHC$_2$H$_4$OH |
| 134 | 3-CH$_3$ | C$_2$H$_5$ | —CH$_2$CH$_2$— | —OC(O)(CH$_2$)$_4$CO— | CN, CONHC$_4$H$_9$—n |
| 135 | 3-CH$_3$ | C$_2$H$_5$ | —CH$_2$CH$_2$— | —OC(O)(CH$_2$)$_4$CO— | CN, CONHC$_6$H$_{11}$ |
| 136 | 3-CH$_3$ | C$_2$H$_5$ | —CH$_2$CH$_2$— | —OC(O)(CH$_2$)$_4$CO— | CONH$_2$, CONH$_2$ |

TABLE 3

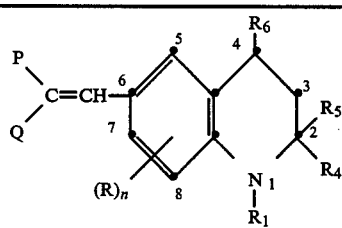

| Example No. | (R)$_n$ | R$_1$ | R$_4$, R$_5$ | R$_6$ | P, Q |
|---|---|---|---|---|---|
| 137 | H | C$_2$H$_5$ | CH$_3$, CH$_3$ | CH$_3$ | CN, CO$_2$CH$_3$ |
| 138 | H | CH$_2$CH$_2$OH | CH$_3$, CH$_3$ | CH$_3$ | CN, SO$_2$CH$_3$ |
| 139 | H | CH$_2$CH$_2$OH | CH$_3$, CH$_3$ | CH$_3$ | CO$_2$CH$_3$, CO$_2$CH$_3$ |
| 140 | H | CH$_2$CH$_2$OH | CH$_3$, CH$_3$ | CH$_3$ | CN, SO$_2$C$_6$H$_5$ |
| 141 | 7-CH$_3$ | CH$_2$CH$_2$OH | CH$_3$, CH$_3$ | CH$_3$ | CN, CO$_2$C$_2$H$_5$ |

TABLE 3-continued

[Structure: P(Q)C=CH- attached at position 6 of a bicyclic system; benzene ring positions 5,6,7,8 fused to a saturated ring with positions 2,3,4 bearing R5, R4 at C2, R6 at C4; N1 with R1 substituent; (R)n on aromatic ring at position 8]

| Example No. | (R)n | R1 | R4, R5 | R6 | P, Q |
|---|---|---|---|---|---|
| 142 | 7-CH3 | C2H4OC(O)CH3 | CH3, CH3 | CH3 | CN, CN |
| 143 | 7-CH3 | C2H4OC(O)NH-C6H5 | CH3, CH3 | CH3 | CN, CN |
| 144 | 7-CH3 | C2H4CN | CH3, CH3 | CH3 | CN, CO2CH3 |
| 145 | 7-CH3 | C2H4OH | CH3, CH3 | CH3 | CN, CONHC6H5 |
| 146 | 7-CH3 | C2H4OH | CH3, CH3 | CH3 | CN, -C(=N-(4-Cl-2-CH3-C6H3)-O-) (benzoxazole) |
| 147 | 7-CH3 | C2H4OH | CH3, CH3 | CH3 | -OC(O)-C(CN)=C(C6H5)- |
| 148 | 7-CH3 | C2H4OH | CH3, CH3 | CH3 | -OC(O)-C(COOH)=C(C6H5)- |
| 149 | 7-CH3 | C2H4OH | CH3, CH3 | CH3 | CN, CONHC2H4OH |
| 150 | 7-CH3 | C2H4OH | CH3, CH3 | CH3 | COC(CH3)2, CN |
| 151 | H | C2H4OH | CH3, CH3 | CH3 | CN, CO2CH3 |
| 152 | H | C2H4OC(O)C2H5 | CH3, CH3 | CH3 | CN, CO2C2H5 |
| 153 | H | C2H4OC(O)C6H5 | CH3, CH3 | CH3 | CN, CONH2 |
| 154 | H | C2H4OCOC2H5 | CH3, CH3 | CH3 | CN, CO2C6H5 |
| 155 | H | CH2C6H5 | CH3, CH3 | CH3 | CN, CO2CH3 |
| 156 | H | CH2-C6H4-CO2CH3 | CH3, CH3 | CH3 | CN, CO2CH3 |
| 157 | H | CH2C6H11 | CH3, CH3 | CH3 | CN, CO2C2H4CN |
| 158 | 7-CH3 | C4H9-n | H, CH3 | H | CN, CO2CH3 |
| 159 | 7-CH3 | CH2CH2OCH2CH2OH | H, CH3 | H | CN, CN |
| 160 | 7-CH3 | CH2CH2OC(O)CH3 | H, CH3 | H | CN, SO2CH3 |
| 161 | 7-CH3 | CH2CH2N(C6H5)SO2CH3 | H, CH3 | H | CN, CO2CH3 |

TABLE 3-continued

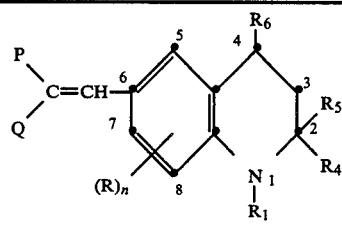

| Example No. | (R)$_n$ | R$_1$ | R$_4$, R$_5$ | R$_6$ | P, Q |
|---|---|---|---|---|---|
| 162 | 7-CH$_3$ | CH$_2$CH$_2$N(phthalimide) | H, CH$_3$ | H | CN, CO$_2$CH$_3$ |
| 163 | 7-CH$_3$ | CH$_2$CH$_2$N(succinimide-like, CO—CH$_2$/CO—CH$_2$) | H, CH$_3$ | H | CN, CO$_2$CH$_3$ |
| 164 | 7-CH$_3$ | CH$_2$CH$_2$SC(=N-aryl)S (benzothiazole) | H, CH$_3$ | H | CN, CO$_2$CH$_3$ |
| 165 | 5-CH$_3$, 8-CH$_3$O | CH$_2$CH$_2$OC(O)CH$_3$ | H, CH$_3$ | H | CN, CO$_2$CH$_3$ |
| 166 | 5,8-di-OCH$_3$ | CH$_2$CH$_2$OC(O)CH$_3$ | H, CH$_3$ | H | CN, CO$_2$CH$_3$ |
| 167 | 7-OC$_2$H$_5$ | CH$_2$CH$_2$OC(O)CH$_3$ | H, CH$_3$ | H | CN, CONHC$_6$H$_{11}$ |
| 168 | 7-CH$_3$ | CH$_2$CH$_2$OC(O)NH—C$_6$H$_5$ | H, CH$_3$ | H | —C(O)—/—C(O)— (phthaloyl) |
| 169 | 7-CH$_3$ | CH$_2$CH$_2$CO$_2$CH$_3$ | H, CH$_3$ | H | CN, CN |
| 170 | 7-CH$_3$ | CH$_2$CH$_2$COOH | H, CH$_3$ | H | CN, COOH |
| 171 | 7-CH$_3$ | CH$_2$CH$_2$CON(C$_2$H$_5$)$_2$ | H, CH$_3$ | H | CONH$_2$, CO$_2$CH$_3$ |
| 172 | H | CH$_2$CH(OH)CH$_3$ | H, H | H | CN, CN |
| 173 | H | CH$_2$CH(C$_6$H$_5$)OH | H, H | H | CN, CN |
| 174 | 7-CH$_3$ | C$_6$H$_5$ | H, CH$_3$ | CH$_3$ | CN, CO$_2$CH$_3$ |
| 175 | 7-CH$_3$ | CH$_2$CH$_2$S—C$_6$H$_5$ | H, CH$_3$ | H | CN, CO$_2$C$_2$H$_4$OH |
| 176 | 7-CH$_3$ | CH$_2$CH$_2$OC$_6$H$_5$ | H, CH$_3$ | H | CN, CO$_2$C$_2$H$_4$Cl |
| 177 | 7-CH$_3$ | CH$_2$CH$_2$CH$_2$SO$_2$CH$_3$ | H, CH$_3$ | H | CN, CO$_2$C$_4$H$_{9-n}$ |
| 178 | 7-Br | CH$_2$CH$_2$SO$_2$—(3,4-diClC$_6$H$_3$) | CH$_3$, CH$_3$ | CH$_3$ | CO$_2$C$_2$H$_5$, CO$_2$C$_2$H$_5$ |

TABLE 3-continued

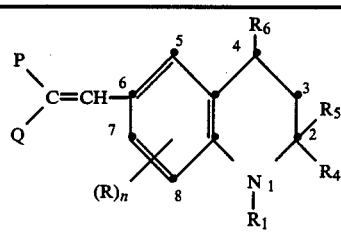

| Example No. | (R)$_n$ | R$_1$ | R$_4$, R$_5$ | R$_6$ | P, Q |
|---|---|---|---|---|---|
| 179 | 7-Cl | CH$_2$—C$_6$H$_4$—COOH | CH$_3$, CH$_3$ | CH$_3$ | COC$_6$H$_5$, SO$_2$CH$_3$ |
| 180 | 7-OCH$_3$ | CH$_2$CH(OCCH$_3$)CH$_2$OCCH$_3$ (with two C=O) | CH$_3$, CH$_3$ | CH$_3$ | CN, CN |
| 181 | 7-CH$_3$ | CH$_2$CH(OH)CH$_2$OH | CH$_3$, H | H | CN, CN |
| 182 | 7-CH$_3$ | CH$_2$CH(OH)CH$_2$OH | CH$_3$, H | H | —OC(O)—C(CONH$_2$)=C(C$_6$H$_5$)— |
| 183 | 7-CH$_3$ | CH$_2$CH=CH$_2$ | CH$_3$, H | H | CN, CO$_2$CH$_3$ |
| 184 | 7-CH$_3$ | CH$_2$CH$_2$N(phthalimide-COOH) | CH$_3$, H | H | CN, CO$_2$CH$_3$ |
| 185 | 7-CH$_3$ | CH$_2$CH$_2$N(CO—CH(OH)—CH$_2$—CO) | CH$_3$, H | H | CN, CO$_2$CH$_3$ |

TABLE 4

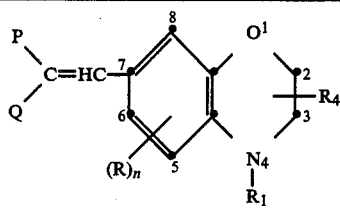

| Example No. | (R)$_n$ | R$_1$ | R$_4$ | P, Q |
|---|---|---|---|---|
| 186 | H | C$_2$H$_4$OH | H | CN, CN |
| 187 | H | C$_2$H$_4$OH | H | CN, SO$_2$CH$_3$ |
| 188 | H | C$_2$H$_4$OH | H | CN, SO$_2$C$_6$H$_5$ |
| 189 | H | C$_2$H$_4$OH | H | CN, CONHC$_6$H$_5$ |
| 190 | H | C$_2$H$_4$OH | H | CN, CONHC$_2$H$_4$OH |
| 191 | H | CH$_2$CH$_2$OCCH$_3$ (O) | H | CN, CN |
| 192 | H | CH$_2$CH$_2$OCCH$_3$ (O) | H | CN, SO$_2$CH$_3$ |

TABLE 4-continued

[Structure: P,Q-C=CH- attached at position 7 of a benzene ring (positions 5,6,7,8), with (R)n at position 5/6, and at positions 2,3 an oxazine-like ring containing O¹, R4, and N4-R1]

| Example No. | (R)n | R₁ | R₄ | P, Q |
|---|---|---|---|---|
| 193 | 6-CH₃ | CH₂CH₂OC(O)CH₃ | H | CN, CO₂CH₃ |
| 194 | 6-CH₃ | CH₂CH₂OC(O)—C₆H₅ | 3-CH₃ | CN, CO₂CH₃ |
| 195 | 6-CH₃ | CH₂CH₂OC(O)CH₃ | 3-CH₃ | —OC(O)—C(CN)=C(C₆H₅)— |
| 196 | 6-CH₃ | CH₂CH(OH)CH₃ | 3-CH₃ | —OC(O)—C(COOH)=C(C₆H₅)— |
| 197 | 6-CH₃ | CH₂CH₂OCH₂CH₂OC(O)CH₃ | 3-CH₃ | —OC(O)—C(CONH₂)=C(C₆H₅)— |
| 198 | 6-CH₃ | CH₂C₆H₅ | 3-CH₃ | CN, CO₂CH₃ |
| 199 | 6-CH₃ | CH₂—C₆H₄—CO₂CH₃ | 3-CH₃ | CN, CN |
| 200 | 6-CH₃ | C₆H₅ | 3-CH₃ | CN, CO₂CH₃ |
| 201 | 6-CH₃ | CH₂—C₆H₄—COOH | 3-CH₃ | CN, CO₂CH₃ |
| 202 | 6-CH₃ | CH₂—C₆H₄—COCl | 3-CH₃ | CN, CN |
| 203 | 6-CH₃ | CH₂CH₂OC(O)CH₃ | 3-CH₃ | phthaloyl (—C(O)—C₆H₄—C(O)—) |
| 204 | 6-CH₃ | CH₂CH₂CN | 3-CH₃ | CN, CO₂CH₃ |
| 205 | 6-CH₃ | CH₂CH₂N(CH₃)SO₂CH₃ | 3-CH₃ | CN, CO₂CH₃ |
| 206 | 6-CH₃ | CH₂CH₂OC(O)NHC₆H₅ | 3-CH₃ | CN, CO₂CH₃ |
| 207 | 6-CH₃ | CH₂CH₂Cl | 3-CH₃ | CN, CO₂CH₃ |
| 208 | 6-CH₃ | CH₂CH₂OC₆H₅ | 3-CH₃ | CN, CO₂CH₃ |
| 209 | 6-CH₃ | CH₂CH₂SC₆H₅ | 3-CH₃ | CN, CO₂CH₃ |

TABLE 4-continued

[Structure: substituted benzene ring with positions 5,6,7,8; with P,Q-C=CH- at position 7, (R)n at positions 5/6, O¹ at position 8 connected via -C(2)-C(3)(R₄)- to N⁴-R₁]

| Example No. | (R)n | R₁ | R₄ | P, Q |
|---|---|---|---|---|
| 210 | 6-CH₃ | CH₂CH₂S-C(=N-Ar)-S (Ar = methylbenzothiazole-like) | 3-CH₃ | CN, COOH |
| 211 | 6-CH₃ | CH₂CH₂SO₂—C₆H₄—CH₃ | 3-CH₃ | CN, CO₂CH₃ |
| 212 | 6-CH₃ | CH₂CH₂N(phthalimido) | 3-CH₃ | CN, CO₂CH₃ |
| 213 | 6-CH₃ | —CH₂CH₂N(CO-)(SO₂-)C₆H₄ (saccharin-type) | 3-CH₃ | CN, CO₂CH₃ |
| 214 | 6-CH₃ | —CH₂CH=CH₂ | 3-CH₃ | CN, CO₂CH₃ |
| 215 | 6-CH₃ | —CH₂CH₂OC₂H₄OH | 3-CH₃ | CN, CN |
| 216 | 6-CH₃ | —CH₂CH₂SO₂CH=CH₂ | 3-CH₃ | CN, CO₂CH₃ |
| 217 | 6-CH₃ | —CH₂CH(OH)CH₂OH | 3-CH₃ | CN, COC(CH₃)₂ |
| 218 | 6-CH₃ | —CH₂C₆H₁₁ | 3-CH₃ | CN, CO₂CH₃ |
| 219 | 6-CH₃ | —CH₂CH₂SO₂N(CH₃)₂ | 3-CH₃ | CN, CO₂CH₃ |
| 220 | 6-CH₃ | —CH₂CH₂CON(CH₃)C₆H₅ | 3-CH₃ | CN, CO₂CH₃ |
| 221 | 6-CH₃ | —CH₂CH₂OC(=O)CH₂Cl | 3-CH₃ | CN, CO₂CH₃ |
| 222 | 6-CH₃ | —CH₂CH₂OC(=O)CH₃ | 3-CH₃ | CN, —C(=N-)benzoxazole-5-Cl |
| 223 | 6-CH₃ | —CH₂CH₂OC(=O)CH₃ | 3-CH₃ | CN, —C(=N-)benzimidazole-NH |

TABLE 4-continued
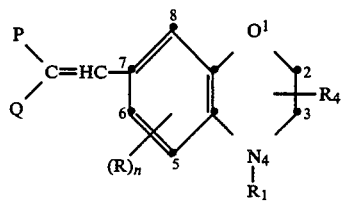
| Example No. | (R)n | R1 | R4 | P, Q |
|---|---|---|---|---|
| 224 | 6-CH3 | —CH2CH2OCCH3 (O) | 3-CH3 | CN, —C(=N-benzothiazole) |
| 225 | 6-CH3 | CH2CH2N(hydantoin-N-CH3) | 3-CH3 | CN, CO2CH3 |
| 226 | 6-CH3 | CH2CH2N(thiazolidine-2,4-dione) | 3-CH3 | CN, CO2CH3 |
| 227 | 6-CH3 | CH2CH2—S—(pyrazine) | 3-CH3 | CN, CO2CH3 |
TABLE 5
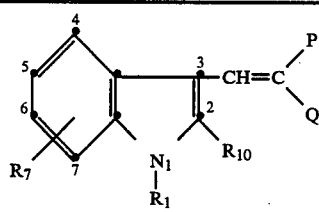
| Example No. | R7 | R1 | R10 | P, Q |
|---|---|---|---|---|
| 228 | H | CH3 | CH3 | CN, CO2CH3 |
| 229 | H | CH3 | C6H5 | CN, CO2CH3 |
| 230 | H | H | C6H5 | CN, CO2C2H5 |
| 231 | H | CH2CH2OCCH3 (O) | C6H5 | CN, SO2CH3 |
| 232 | H | CH2CH2OCCH3 (O) | C6H5 | CN, SO2C6H5 |
| 233 | H | CH2CH2OCCH3 (O) | C6H5 | CN, CN |

TABLE 5-continued

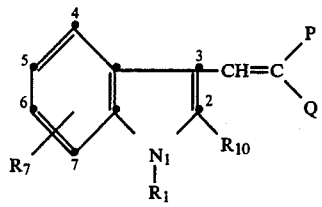

| Example No. | $R_7$ | $R_1$ | $R_{10}$ | P, Q |
|---|---|---|---|---|
| 234 | H | $CH_2CH_2O\overset{O}{\overset{\|}{C}}CH_3$ | $C_6H_5$ | ![phthaloyl diketone group] |
| 235 | H | $CH_2CH_2O\overset{O}{\overset{\|}{C}}CH_3$ | $C_6H_5$ | CN, $CONHC_6H_5$ |
| 236 | H | $CH_2CH_2OH$ | $C_6H_5$ | $-\overset{O}{\overset{\|}{OC}}-\overset{CN}{\overset{\|}{C}}=\overset{C_6H_5}{\overset{\|}{C}}-$ |
| 237 | H | $CH_2CH_2OH$ | $C_6H_5$ | CN, $CONH_2$ |
| 238 | H | $CH_2CH_2OH$ | $C_6H_5$ | CN, benzoxazolyl |
| 239 | H | $CH_2CH_2OH$ | $C_6H_5$ | CN, $CO_2C_6H_5$ |
| 240 | H | $CH_2CH_2OH$ | $C_6H_5$ | CN, $CONH_2$ |
| 241 | H | $CH_3$ | $C_6H_5$ | $-\overset{O}{\overset{\|}{OC}}-\overset{COOH}{\overset{\|}{C}}=\overset{C_6H_5}{\overset{\|}{C}}-$ |
| 242 | H | $CH_3$ | thienyl (S) | CN, $CO_2CH_3$ |
| 243 | H | $CH_3$ | 4-Br-$C_6H_4$ | CN, $CO_2CH_3$ |
| 244 | H | $CH_3$ | 4-$CH_3$-$C_6H_4$ | CN, $CO_2C_2H_4OH$ |
| 245 | 5-$CH_3$ | $CH_3$ | $CH_3$ | CN, $CO_2CH_3$ |
| 246 | 5-Cl | $CH_3$ | $CH_3$ | CN, $CO_2CH_3$ |
| 247 | 5-$OCH_3$ | $CH_3$ | $CH_3$ | CN, $CO_2CH_3$ |
| 248 | H | $CH_2C_6H_5$ | $C_6H_5$ | CN, $CO_2CH_3$ |
| 249 | H | $CH_2$-$C_6H_4$-$CO_2CH_3$ | $C_6H_5$ | CN, CN |
| 250 | H | $CH_2$-$C_6H_4$-$COOH$ | $C_6H_5$ | CN, CN |

TABLE 5-continued

| Example No. | R7 | R1 | R10 | P, Q |
|---|---|---|---|---|
| 251 | H | CH2CH2CN | C6H5 | CN, CO2CH3 |
| 252 | H | CH2CH2CONH2 | C6H5 | CN, CO2CH2CH2CN |
| 253 | H | CH2CH2CH2NHC(O)C6H5 | C6H5 | CN, CO2CH3 |
| 254 | H | CH2CH2CH2NHSO2C6H5 | C6H5 | CN, CO2CH3 |
| 255 | H | CH2CH2CH2N(CH3)SO2CH3 | C6H5 | CN, CO2CH3 |
| 256 | H | CH2CH2CH2N(C2H4OH)SO2CH3 | C6H5 | CN, CO2CH3 |
| 257 | H | CH3 | H | CN, CO2CH3 |
| 258 | H | CH3 | H | CO2CH3, -C(=N-)NH- (benzimidazole) |
| 259 | H | CH3 | H | CN, COOH |
| 260 | H | CH3 | C6H5 | CN, CO2CH2C6H5 |
| 261 | H | CH3 | C6H4—p-COOH | CN, CO2CH2C6H11 |
| 262 | H | C4H9—n | C6H4—p-CO2CH3 | CN, CO2CH3 |
| 263 | H | CH2CH2CH2N(phthalimido) | C6H5 | CN, CO2CH3 |
| 264 | H | CH2CH2CH2N(COCH2)2 | C6H5 | CN, CO2CH3 |
| 265 | H | CH2CH2CH2N(COCH2)2O (morpholinedione) | C6H5 | CN, CO2CH3 |
| 266 | H | CH2CH2CH2N(CO-C6H4-CH2) (isoindolinone) | C6H5 | CN, CO2CH3 |
| 267 | H | CH2CH2CH2N(CO-CH2-CH2-CH2) (2-pyrrolidinone) | C6H5 | CN, CO2CH3 |

TABLE 5-continued

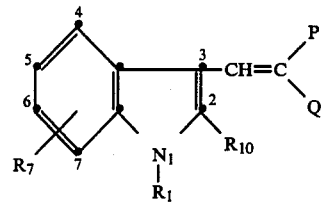

| Example No. | $R_7$ | $R_1$ | $R_{10}$ | P, Q |
|---|---|---|---|---|
| 268 | H | $C_6H_5$ | $C_6H_5$ | CN, $CO_2CH_3$ |

TABLE 6

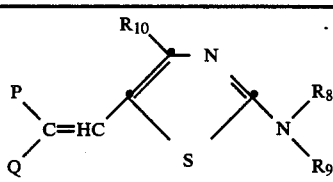

| Example No. | $R_8$ | $R_9$ | $R_{10}$ | P, Q |
|---|---|---|---|---|
| 269 | $CH_3$ | $CH_3$ | $CH_3$ | CN, $CO_2CH_3$ |
| 270 | $CH_3$ | $CH_3$ | $CH_3$ | CN, $CO_2C_2H_5$ |
| 271 | $CH_3$ | $CH_3$ | $C_6H_5$ | CN, $CO_2CH_3$ |
| 272 | $CH_3$ | $CH_3$ | $C_6H_5$ | CN, COOH |
| 273 | $CH_3$ | $CH_3$ | $C_6H_5$ | $CO_2C_2H_5$, $CO_2C_2H_5$ |
| 274 | $CH_3$ | $CH_3$ | $C_6H_5$ | CN, $CONHC_2H_4OH$ |
| 275 | $CH_3$ | $CH_2CH_2OH$ | $C_6H_5$ | CN, CN |
| 276 | $CH_3$ | $CH_2CH_2OH$ | $C_6H_5$ | CN, $SO_2CH_3$ |
| 277 | $CH_3$ | $CH_2CH_2OH$ | $C_6H_5$ | CN, $SO_2C_6H_5$ |
| 278 | $CH_3$ | $CH_2CH_2OH$ | $C_6H_5$ | CN, $CONHC_6H_5$ |
| 279 | $CH_3$ | $CH_2CH_2OH$ | $C_6H_5$ | 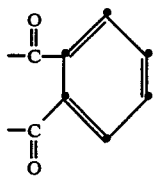 |
| 280 | $CH_3$ | $CH_2CH_2OH$ | $C_6H_5$ | $-OC(=O)-C(CN)=C(C_6H_5)-$ |
| 281 | $CH_3$ | $CH_2CH_2OCOCH_3$ | $C_6H_5$ | CN, CN |
| 282 | $CH_3$ | $CH_2CH_2OCOC_2H_5$ | $C_6H_5$ | CN, CN |
| 283 | $C_2H_5$ | $C_2H_5$ | $C_6H_5$ | CN, $CO_2CH_3$ |
| 284 | $C_2H_5$ | $C_2H_5$ | $C_6H_5$ | CN, $CO_2CH_2CH_2CN$ |
| 285 | $C_2H_5$ | 4-$CH_3$-$C_6H_4$- | $C_6H_5$ | CN, $CO_2CH_3$ |
| 286 | $C_2H_5$ | 4-$CH_3$-$C_6H_4$-$CH_2$- | $C_6H_5$ | CN, $CO_2CH_3$ |

TABLE 6-continued

[Structure: P,Q-C=CH-C(CH₃)(=C(R₁₀)-N)-C(S)=N(R₈)(R₉)]

| Example No. | R₈ | R₉ | R₁₀ | P, Q |
|---|---|---|---|---|
| 287 | $C_2H_5$ | 4-Cl-C₆H₄- | $C_6H_5$ | CN, $CO_2CH_3$ |
| 288 | $CH_2CH_2OH$ | C₆H₅- | $C_6H_5$ | CN, CN |
| 289 | $CH_3$ | $CH_3$ | H | CN, $CO_2CH_3$ |
| 290 | $CH_2CH_2OH$ | C₆H₅- | $C_6H_5$ | —CN, benzoxazol-2-yl (methyl-substituted) |
| 291 | $CH_2CH_2OH$ | C₆H₅- | $C_6H_5$ | CN, benzimidazol-2-yl (NH) |
| 292 | $CH_2CH_2OH$ | C₆H₅- | $C_6H_5$ | CN, benzothiazol-2-yl (methyl-substituted) |
| 293 | $CH_2CH_2OH$ | C₆H₅- | $C_6H_5$ | CN, $SO_2$-C₆H₄-CH₃ |
| 294 | $CH_2CH_2OH$ | C₆H₅- | $C_6H_5$ | CN, $SO_2$-(2,4-Cl₂-C₆H₃) |
| 295 | $CH_2CH_2OH$ | C₆H₅- | $C_6H_5$ | CN, $SO_2$-C₆H₄-OCH₃ |
| 296 | $CH_3$ | $CH_2C_6H_5$ | $C_6H_5$ | CN, $CO_2CH_3$ |
| 297 | $CH_2C_6H_5$ | $CH_2C_6H_5$ | $C_6H_5$ | CN, $CO_2CH_3$ |
| 298 | $CH_3$ | $C_6H_{11}$ | $C_6H_5$ | CN, $CO_2CH_3$ |
| 299 | $C_4H_9-n$ | $C_4H_9-n$ | $C_6H_5$ | CN, $CO_2CH_3$ |

TABLE 6-continued

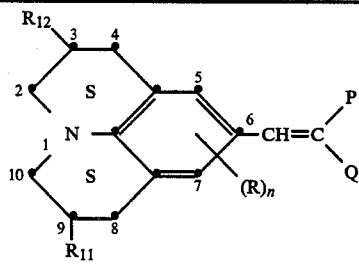

| Example No. | $R_8$ | $R_9$ | $R_{10}$ | P, Q |
|---|---|---|---|---|
| 300 | $CH_3$ | $CH_3$ | thienyl | $CN, CO_2CH_3$ |
| 301 | $CH_3$ | $C_6H_5$ | thienyl | $CN, CO_2CH_3$ |
| 302 | $CH_3$ | $C_6H_5$ | Cl-thienyl | $CN, CO_2CH_3$ |
| 303 | $CH_3$ | $C_6H_5$ | Br-thienyl | $CN, CO_2CH_3$ |
| 304 | $CH_3$ | $C_6H_5$ | thienyl | $-OC(O)-C(COOH)=C(C_6H_5)-$ |
| 305 | $C_4H_9-n$ | $C_6H_5$ | thienyl | $-OC(O)-C(CO_2CH_3)=C(C_6H_5)(CH_3)$ |

TABLE 7

| Example No. | $(R)_n$ | $R_{11}$ | $R_{12}$ | P, Q |
|---|---|---|---|---|
| 306 | H | H | H | $CN, CO_2CH_3$ |
| 307 | H | H | H | $CN, CO_2CH_2CH_2CN$ |
| 308 | H | H | H | $CN, CO_2CH_2CH_2OH$ |
| 309 | H | H | H | $CN, CO_2CH_2CH_2C_6H_5$ |
| 310 | H | H | H | $CN, CO_2CH_2C_6H_{11}$ |
| 311 | H | H | H | $CO_2C_2H_5, CO_2C_2H_5$ |
| 312 | H | H | H | $COOH, CN$ |
| 313 | H | H | H | $-OC(O)-C(COOH)=C(C_6H_5)-$ |
| 314 | 5-$CH_3$ | H | H | $CN, CO_2CH_3$ |
| 315 | 5-$OCH_3$ | H | H | $CN, CO_2CH_3$ |
| 316 | 5-Cl | H | H | $CN, CO_2CH_3$ |
| 317 | 5,7-di-$CH_3$ | H | H | $CN, CO_2CH_3$ |
| 318 | 5-$CH_3$ | OH | H | $CN, CN$ |

TABLE 7-continued

| Example No. | (R)n | R11 | R12 | P, Q |
|---|---|---|---|---|
| 319 | 5-CH₃ | OH | H | benzene-1,2-dicarbonyl (phthaloyl) diketone group |
| 320 | 5-CH₃ | OH | H | CN, benzoxazol-2-yl |
| 321 | 5-CH₃ | OH | H | CN, benzimidazol-2-yl |
| 322 | 5-CH₃ | OH | H | CN, SO₂—C₆H₅ |
| 323 | 5-CH₃ | OH | H | CN, SO₂—(3,4-dichlorophenyl) |
| 324 | 5-CH₃ | OH | H | CN, 5-phenyl-1,3,4-oxadiazol-2-yl |
| 325 | 5-CH₃ | OH | H | —OC(=O)—C(CN)=C(C₆H₅)— |
| 326 | 5-CH₃ | OCOC₂H₅ | H | CN, CN |
| 327 | 5-CH₃ | OCOC₆H₅ | H | CN, CO₂CH₃ |
| 328 | 5-CH₃ | OCOCH₂Cl | H | CN, CO₂CH₃ |
| 329 | H | OH | OH | CN, CN |

TABLE 7-continued
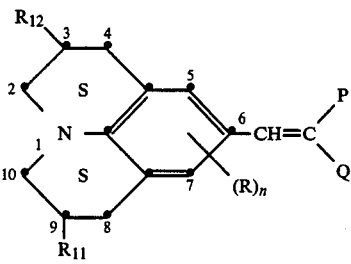
| Example No. | (R)$_n$ | R$_{11}$ | R$_{12}$ | P, Q |
|---|---|---|---|---|
| 330 | H | OC(=O)CH$_3$ | OC(=O)CH$_3$ | CN, CN |
| 331 | H | CH$_3$ | H | CN, CO$_2$CH$_3$ |
| 332 | H | CH$_3$ | CH$_3$ | CN, CO$_2$CH$_3$ |
| 333 | H | OC(=O)NHC$_6$H$_5$ | H | CN, CO$_2$CH$_3$ |
| 334 | H | OC(=O)CH$_2$OCH$_3$ | H |  |
| 335 | H | OC(=O)CH$_2$OC$_6$H$_5$ | H |  |
| 336 | H | OC(=O)CH$_2$C$_6$H$_5$ | H |  |
| 337 | H | OC(=O)NHC$_2$H$_5$ | H | 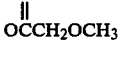 |
| 338 | H | 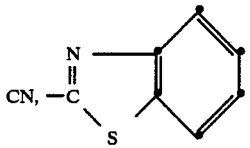 | H | CN, CN |
| 339 | H | 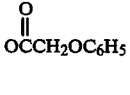 | H | CN, CO$_2$CH$_3$ |
| 340 | H | OC(=O)CH$_3$ | H | 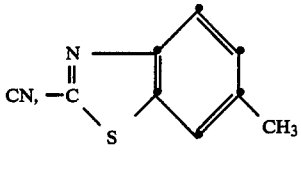 |

TABLE 7-continued

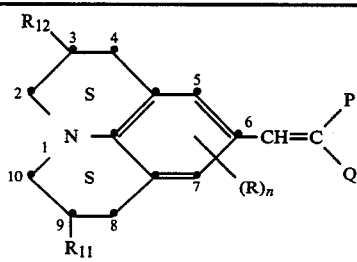

| Example No. | (R)$_n$ | R$_{11}$ | R$_{12}$ | P, Q |
|---|---|---|---|---|
| 341 | H | O‖OCCH$_3$ | H | CN, —C$_6$H$_4$—CO$_2$CH$_3$ |

TABLE 8

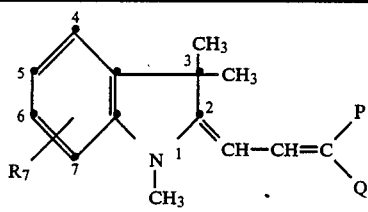

| Example No. | R$_7$ | P, Q |
|---|---|---|
| 342 | H | CN, CO$_2$CH$_3$ |
| 343 | H | CO$_2$CH$_2$CH$_3$, CO$_2$CH$_2$CH$_3$ |
| 344 | H | CO$_2$CH$_3$, SO$_2$CH$_3$ |
| 345 | H | CO$_2$CH$_3$, SO$_2$C$_6$H$_5$ |
| 346 | H | CN, CONHC$_2$H$_4$OH |
| 347 | H | CN, CO$_2$CH$_2$CH$_2$OH |
| 348 | H | CN, CO$_2$CH$_2$CH$_2$OC$_2$H$_5$ |
| 349 | H | CN, CO$_2$CH$_2$CH$_2$Cl |
| 350 | H | CN, CO$_2$CH$_2$CH$_2$C$_6$H$_5$ |
| 351 | H | CN, CO$_2$CH$_2$CH$_2$OC$_6$H$_5$ |
| 352 | H | CN, CO$_2$C$_6$H$_5$ |
| 353 | H | CN, CO$_2$C$_6$H$_{11}$ |
| 354 | H | CN, CO$_2$CH$_2$C$_6$H$_{11}$ |
| 355 | H | CN, CO$_2$CH$_2$C$_6$H$_5$ |
| 356 | 5-CH$_3$ | CN, CO$_2$CH$_2$CH(CH$_3$)$_2$ |
| 357 | 5-OCH$_3$ | CN, CO$_2$CH$_2$CH$_2$CN |
| 358 | 5-Cl | CN, CO$_2$CH$_2$-(furyl) |
| 359 | 5-COOH | CN, CN |
| 360 | 5-COOH | CN, CO$_2$CH$_3$ |
| 361 | 5-COOH | CN, COOH |
| 362 | 5-COOH | CN, CONHC$_6$H$_5$ |
| 363 | 5-COOH | CN, CONHC$_2$H$_5$ |
| 364 | 5-COOH | CN, SO$_2$CH$_3$ |
| 365 | 5-COOH | CN, SO$_2$C$_6$H$_5$ |
| 366 | 5-CO$_2$CH$_3$ | CN, COC(CH$_3$)$_3$ |
| 367 | 5-CO$_2$CH$_3$ | phthaloyl (—CO—C$_6$H$_4$—CO—) |
| 368 | 5-CO$_2$CH$_3$ | —OC(O)—C(CN)=C(C$_6$H$_5$)— |
| 369 | 5-CO$_2$CH$_3$ | —OC(O)—C(CO$_2$CH$_3$)=C(C$_6$H$_5$)— |
| 370 | 5-CO$_2$CH$_3$ | CN, benzisoxazolyl (5-Cl) |
| 371 | 5-CO$_2$CH$_3$ | CN, benzimidazolyl |
| 372 | 5-CO$_2$CH$_3$ | CN, SO$_2$—C$_6$H$_3$(Cl)$_2$ |
| 373 | 5-CO$_2$CH$_2$CH$_3$ | CN, CO$_2$C$_2$H$_5$ |
| 374 | 5-CO$_2$CH$_2$C$_6$H$_5$ | CN, CO$_2$CH$_3$ |
| 375 | 5-CO$_2$CH$_2$CH$_2$OH | CN, CO$_2$CH$_3$ |
| 376 | 5-CO$_2$CH$_2$CH$_2$C$_6$H$_5$ | CN, CN |
| 377 | 5-CO$_2$CH$_2$CH$_2$CN | CN, CO$_2$CH$_3$ |
| 378 | 5-CO$_2$CH(CH$_3$)$_2$ | CN, CO$_2$CH$_3$ |
| 379 | 5-COOH | CN, COOH |

TABLE 8-continued

Structure: indoline with 3,3-dimethyl, N-CH3, 2-position has =CH-CH=C(P)(Q), R7 substituent on benzene ring (positions 4,5,6,7)

| Example No. | R7 | P, Q |
|---|---|---|
| 380 | 5-COOH | OC(=O)-C(COOH)=C(C6H5)- |
| 381 | 5-COOH | OC(=O)-C(CONH2)=C(C6H5)- |
| 382 | 5-COOH | $CO_2CH_3$, C-(benzoxazole with 2-methyl substituent) |
| 383 | 5-COOH | CN, C-(benzothiazole with 2-methyl substituent) |
| 384 | 5-COOH | CN, CONH-(2,5-dimethoxyphenyl) |

TABLE 9

Structure: $R_1R_2N$-phenyl(-(R)$_n$)-CH=CH-CH=C(P)(Q)

| Example No. | (R)$_n$ | R$_1$ | R$_2$ | P,Q |
|---|---|---|---|---|
| 385 | H | CH$_3$ | CH$_3$ | CN, CO$_2$C$_2$H$_5$ |
| 386 | H | CH$_3$ | CH$_3$ | CN, CO$_2$C$_2$H$_4$OH |
| 387 | 3-CH$_3$ | CH$_3$ | CH$_3$ | CN, CO$_2$CH$_3$ |
| 388 | 3-OC$_2$H$_5$ | CH$_3$ | CH$_3$ | CN, CO$_2$CH$_3$ |
| 389 | 3-Cl | CH$_3$ | CH$_3$ | CN, CO$_2$CH$_2$CH$_2$CN |
| 390 | 2-OCH$_3$, 5-CH$_3$ | C$_2$H$_5$ | C$_2$H$_5$ | CN, CO$_2$CH$_2$CH$_2$OCH$_3$ |
| 391 | 2,5-di-OCH$_3$ | C$_2$H$_5$ | C$_2$H$_5$ | CN, CO$_2$C$_6$H$_5$ |
| 392 | 2,5-di-CH$_3$ | C$_2$H$_5$ | C$_2$H$_5$ | CN, CO$_2$CH$_2$CH$_2$C$_6$H$_5$ |
| 393 | 3-CH$_3$ | C$_4$H$_9$—n | C$_4$H$_9$—n | CN, CO$_2$CH$_2$CH$_2$OC$_6$H$_5$ |
| 394 | 3-C$_2$H$_5$ | CH$_2$CH(CH$_3$)$_2$ | C$_2$H$_5$ | CN, CONHC$_2$H$_4$OH |
| 395 | H | C$_6$H$_5$ | C$_2$H$_5$ | CN, CO$_2$CH$_3$ |
| 396 | 3-OCH$_3$ | C$_6$H$_5$ | C$_2$H$_5$ | CN, CO$_2$CH$_3$ |
| 397 | H | C$_6$H$_5$ | C$_6$H$_5$ | CN, CO$_2$CH$_3$ |
| 398 | H | C$_6$H$_5$ | C$_6$H$_5$ | CO$_2$C$_2$H$_5$, CO$_2$C$_2$H$_5$ |
| 399 | H | C$_6$H$_{11}$ | C$_6$H$_5$ | CN, CO$_2$CH$_3$ |
| 400 | H | CH$_2$—C$_6$H$_5$ | CH$_2$—C$_6$H$_5$ | CN, CO$_2$CH$_3$ |
| 401 | H | CH$_2$—C$_6$H$_4$—COOH | CH$_2$—C$_6$H$_4$—COOH | CN, CN |
| 402 | H | CH$_2$—C$_6$H$_4$—CO$_2$CH$_3$ | CH$_2$—C$_6$H$_4$—CO$_2$CH$_3$ | CN, CN |

TABLE 9-continued

Structure:
R₂(R₁)N—C₆H₃(R)ₙ—CH=CH—CH=CH—C(P)(Q), with positions 1-6 on the ring, N at position 1, CH=CH chain at position 4, (R)ₙ at positions 5/6.

| Example No. | (R)ₙ | R₁ | R₂ | P, Q |
|---|---|---|---|---|
| 403 | H | CH₂—C₆H₄—CO₂C₂H₅ | CH₂—C₆H₄—CO₂CH₃ | CN, SO₂CH₃ |
| 404 | H | CH₂—C₆H₄—CO₂CH₃ | C₂H₅ | CN, —C(=N—)—O— (benzoxazole, CH₃ substituted) |
| 405 | 3-CH₃ | CH₂—C₆H₄—Cl | CH₂—C₆H₄—Cl | —OC(=O)—C(COOH)=C(C₆H₅)— |
| 406 | 3-CH₃ | CH₂CH₂Cl | CH₂CH₂Cl | CN, CO₂CH₃ |
| 407 | 3-CH₃ | CH₂CH₂OC₂H₄OC₂H₅ | C₂H₅ | CN, CO₂CH₃ |
| 408 | 3-CH₃ | CH₂CH₂OH | CH₂CH₂OH | CN, CN |
| 409 | 3-CH₃ | CH₂CH₂OH | CH₂CH₂OH | phthaloyl (—C(=O)—C₆H₄—C(=O)—) |
| 410 | 3-CH₃ | CH₂CH₂OCCH₃ (O) | CH₂CH₂OCCH₃ (O) | phthaloyl (—C(=O)—C₆H₄—C(=O)—) |
| 411 | 3-CH₃ | CH₂CH₂OCCH₃ (O) | CH₂CH₂OCCH₃ (O) | CN, —C(=N—)—S— (benzothiazole, CH₃ substituted) |
| 412 | 3-CH₃ | CH₂CH(OH)CH₂OH | C₂H₅ | CN, CN |
| 413 | 3-CH₃ | CH₂CH(OH)CH₂OH | C₂H₅ | CN, SO₂CH₃ |
| 414 | 3-CH₃ | CH₂CH(OCCH₃)CH₂OCCH₃ (O)(O) | C₂H₅ | CN, SO₂C₆H₅ |
| 415 | 3-CH₃ | CH₂CH(OH)CH₃ | C₂H₅ | CN, SO₂C₆H₁₁ |
| 416 | 3-CH₃ | CH₂CH₂OCOC₂H₅ (O) | CH₂CH₂OCOC₂H₅ (O) | CN, CN |
| 417 | 3-CH₃ | CH₂CH₂OCC₆H₅ (O) | CH₂CH₂OCOC₂H₅ (O) | CN, CN |

TABLE 9-continued

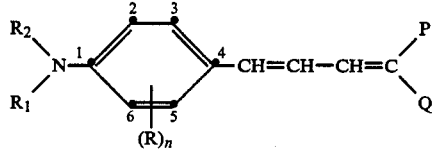

| Example No. | (R)$_n$ | R$_1$ | R$_2$ | P,Q |
|---|---|---|---|---|
| 418 | 3-CH$_3$ | CH$_2$CH$_2$OCNH—C$_6$H$_5$ (with C=O) | CH$_2$CH$_2$OCNH—C$_6$H$_5$ (with C=O) | CN, CO$_2$CH$_3$ |
| 419 | 3-CH$_3$ | CH$_2$CH$_2$OCC$_2$H$_5$ (with C=O) | CH$_2$CH$_2$OCC$_2$H$_5$ (with C=O) | CN, SO$_2$—(3,4-dichlorophenyl) |
| 420 | 3-CH$_3$ | CH$_2$CH$_2$OCC$_2$H$_5$ (with C=O) | CH$_2$CH$_2$OCC$_2$H$_5$ (with C=O) | CN, —C(=N—benzimidazole) |
| 421 | 3-CH$_3$ | CH$_2$CH$_2$OC—(furyl) (with C=O) | CH$_2$CH$_2$OC—(furyl) (with C=O) | CN, CO$_2$CH$_3$ |
| 422 | 3-CH$_3$ | CH$_2$CH$_2$OCCH$_2$—C$_6$H$_5$ (with C=O) | CH$_2$CH$_2$OCCH$_2$—C$_6$H$_5$ (with C=O) | CN, CN |
| 423 | 3-CH$_3$ | CH$_3$ | CH$_3$ | CN, CO$_2$CH$_2$—(furyl) |

TABLE 10

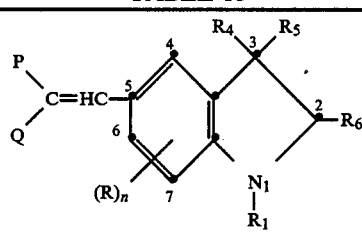

| Example No. | (R)$_n$ | R$_1$ | R$_4$, R$_5$ | R$_6$ | P, Q |
|---|---|---|---|---|---|
| 424 | H | CH$_3$ | CH$_3$, CH$_3$ | CH$_3$ | CN, CO$_2$CH$_3$ |
| 425 | H | CH$_3$ | CH$_3$, CH$_3$ | CH$_3$ | CN, CO$_2$C$_2$H$_4$OH |
| 426 | H | CH$_3$ | CH$_3$, CH$_3$ | CH$_3$ | CN, CONHC$_2$H$_4$OH |
| 427 | H | CH$_3$ | CH$_3$, CH$_3$ | CH$_3$ | CN, CO$_2$CH$_2$CH$_2$CN |
| 428 | H | CH$_3$ | CH$_3$, CH$_3$ | CH$_3$ | CN, CO$_2$CH$_2$CH$_2$OC$_2$H$_5$ |
| 429 | H | CH$_3$ | CH$_3$, CH$_3$ | CH$_3$ | CN, CO$_2$CH$_2$CH$_2$C$_6$H$_5$ |
| 430 | H | CH$_3$ | CH$_3$, CH$_3$ | CH$_3$ | CN, CO$_2$CH$_2$C$_6$H$_5$ |
| 431 | H | CH$_3$ | CH$_3$, CH$_3$ | CH$_3$ | CN, CO$_2$CH$_2$CH$_2$OC$_6$H$_5$ |
| 432 | H | CH$_2$CH$_2$Cl | CH$_3$, CH$_3$ | CH$_3$ | CN, CO$_2$C$_2$H$_5$ |
| 433 | H | CH$_2$CH$_2$OH | CH$_3$, CH$_3$ | CH$_3$ | CO$_2$C$_2$H$_5$, CO$_2$C$_2$H$_5$ |
| 434 | H | CH$_2$CH$_2$OC$_6$H$_5$ | CH$_3$, CH$_3$ | CH$_3$ | CO$_2$CH$_3$, SO$_2$CH$_3$ |

TABLE 10-continued

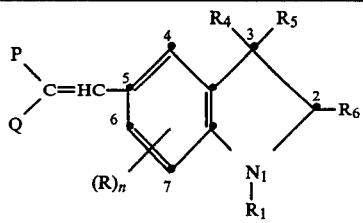

| Example No. | (R)$_n$ | R$_1$ | R$_4$, R$_5$ | R$_6$ | P, Q |
|---|---|---|---|---|---|
| 435 | H | CH$_2$CH$_2$OC(O)CH$_3$ | CH$_3$, CH$_3$ | CH$_3$ | CN, CN |
| 436 | H | CH$_2$CH$_2$OC(O)CH$_3$ | CH$_3$, CH$_3$ | CH$_3$ | CN, SO$_2$C$_6$H$_5$ |
| 437 | H | CH$_2$CH$_2$OC(O)CH$_3$ | CH$_3$, CH$_3$ | CH$_3$ | CN, SO$_2$CH$_3$ |
| 438 | H | CH$_2$CH$_2$OC(O)CH$_3$ | CH$_3$, CH$_3$ | CH$_3$ | CN, CONHC$_6$H$_5$ |
| 439 | H | CH$_2$CH$_2$OC(O)CH$_3$ | CH$_3$, H | CH$_3$ | CN, CONHC$_2$H$_4$OH |
| 440 | H | CH$_2$CH$_2$OC(O)CH$_3$ | H, H | H | CN, SO$_2$CH$_3$ |
| 441 | H | CH$_2$CH$_2$OC(O)CH$_3$ | H, H | C$_6$H$_5$ | CN, CO$_2$CH$_3$ |
| 442 | 6-Cl | CH$_2$CH$_2$OC(O)CH$_3$ | H, H | CH$_3$ | phthaloyl (–C(O)–C$_6$H$_4$–C(O)–) |
| 443 | 7-CH$_3$ | CH$_2$CH$_2$OC(O)CH$_3$ | H, H | CH$_3$ | CN, CONH–C$_6$H$_4$–CH$_3$ |
| 444 | H | CH$_2$CH$_2$OC(O)OC$_2$H$_5$ | H, H | CH$_3$ | –C(O)–C(CN)=C(C$_6$H$_5$)– |
| 445 | H | CH$_2$CH$_2$OC(O)C$_6$H$_5$ | H, H | CH$_3$ | –C(O)–C(CO$_2$CH$_3$)=C(C$_6$H$_5$)– |
| 446 | H | CH$_2$CH$_2$OC(O)NH–C$_6$H$_5$ | H, H | CH$_3$ | –C(O)–C(COOH)=C(C$_6$H$_5$)– |
| 447 | H | CH$_2$CH$_2$CH$_2$NHC(O)–C$_6$H$_5$ | H, H | CH$_3$ | CN, CO$_2$CH$_3$ |
| 448 | H | CH$_2$CH$_2$Cl | H, H | CH$_3$ | CN, CO$_2$CH$_3$ |

TABLE 10-continued

| Example No. | (R)$_n$ | R$_1$ | R$_4$, R$_5$ | R$_6$ | P, Q |
|---|---|---|---|---|---|
| 449 | H | CH$_2$CH$_2$CH$_2$N(COCH$_2$)(COCH$_2$) (morpholine-2,6-dione) | H, H | CH$_3$ | CN, CO$_2$C$_6$H$_5$ |
| 450 | H | CH$_2$–C$_6$H$_5$ | H, H | CH$_3$ | CN, CO$_2$CH$_2$C$_6$H$_5$ |
| 451 | H | CH$_2$–C$_6$H$_4$–CO$_2$CH$_3$ | H, H | CH$_3$ | CN, CN |
| 452 | H | CH$_2$–C$_6$H$_4$–CO$_2$H | H, H | CH$_3$ | CN, CN |
| 453 | H | CH$_2$–C$_6$H$_4$–CO$_2$H | H, H | CH$_3$ | CN, C(=N–O–)(chloromethylphenyl-benzisoxazole) |
| 454 | H | CH$_2$–C$_6$H$_4$–CO$_2$H | H, H | CH$_3$ | CN, C(benzimidazol-2-yl) |
| 455 | H | CH$_2$–C$_6$H$_4$–CO$_2$H | H, H | CH$_3$ | CN, C(methylbenzimidazol-2-yl) |
| 456 | H | CH$_2$–C$_6$H$_4$–CO$_2$H | H, H | CH$_3$ | CN, SO$_2$–(3,4-dichlorophenyl) |
| 457 | H | C$_6$H$_5$ | H, H | CH$_3$ | CN, CO$_2$CH$_3$ |
| 458 | H | CH$_2$CH$_2$OC(O)CH$_2$C$_6$H$_5$ | H, H | CH$_3$ | CN, CO$_2$CH$_2$CN |
| 459 | H | CH$_2$CH$_2$OC(O)CH$_3$ | H, H | CH$_3$ | CN, COC(CH$_3$)$_3$ |

TABLE 10-continued

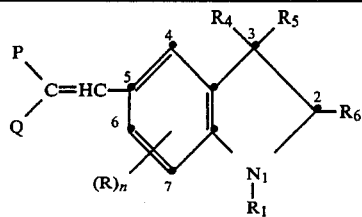

| Example No. | (R)ₙ | R₁ | R₄, R₅ | R₆ | P, Q |
|---|---|---|---|---|---|
| 460 | H | CH₂CH₂OC(O)CH₃ | H, H | CH₃ | CN, COC₆H₅ |
| 461 | H | CH₂CH₂OC(O)CH₃ | H, H | CH₃ | CN, COOH |
| 462 | H | CH₂CH₂OC(O)CH₃ | H, H | CH₃ | CN, C₆H₅ |
| 463 | H | CH₂CH₂OC(O)CH₃ | H, H | CH₃ | CN, 2-thienyl |
| 464 | H | CH₂CH₂OC(O)CH₃ | H, H | CH₃ | CN, 2-furyl |

TABLE 11

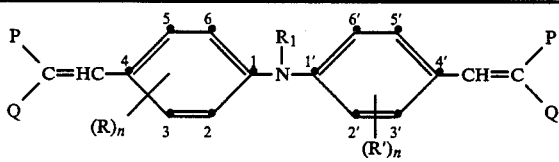

| Example No. | (R)ₙ | (R')ₙ | R₁ | P, Q |
|---|---|---|---|---|
| 465 | H | H | CH₂CH₂OH | CN, CN |
| 466 | H | H | CH₂CH₂OH | CN, CONH₂ |
| 467 | H | H | CH₂CH₂OH | CN, CO₂CH₃ |
| 468 | H | H | CH₂CH₂OH | CN, CONHC₆H₅ |
| 469 | H | H | CH₂CH₂OH | phthaloyl |
| 470 | H | H | CH₂CH₂OC(O)CH₃ | CN, CN |
| 471 | H | H | CH₂CH₂OC(O)CH₃ | CN, CO₂CH₃ |
| 472 | H | H | CH₂CH₂OC(O)CH₃ | CN, SO₂CH₃ |

TABLE 11-continued

Structure: P(Q)C=HC—[benzene ring with (R)n, positions 2,3,4,5,6]—N(R₁)—[benzene ring with (R')n, positions 2',3',4',5',6']—CH=C(P)(Q), with N at position 1/1' and C=HC at position 4/4'.

| Example No. | (R)n | (R')n | R₁ | P, Q |
|---|---|---|---|---|
| 473 | H | H | CH₂CH₂OC(=O)CH₃ | CN, SO₂C₆H₅ |
| 474 | H | H | CH₂CH₂OC(=O)CH₃ | CN—C(=N—O—[benzo])—, benzoxazole-type |
| 475 | H | H | CH₂CH₂OC(=O)CH₃ | —OC(=O)—C(CN)=C(C₆H₅)— |
| 476 | H | H | CH₂CH₂OC(=O)CH₃ | —C(=O)—C(CN)=C(C₆H₅)— |
| 477 | H | H | CH₂CH₂OC(=O)CH₃ | CN, COC₆H₅ |
| 478 | H | H | CH₂CH₂OC(=O)CH₃ | CN, COC(CH₃)₃ |
| 479 | H | H | CH₂CH₂OC(=O)C₂H₅ | CN, C₆H₅ |
| 480 | H | H | CH₂CH₂Cl | CN, CO₂CH₃ |
| 481 | 3-CH₃ | H | CH₂CH₂OH | CN, CO₂CH₃ |
| 482 | 3-CH₃ | H | C₂H₅ | CN, CO₂CH₃ |
| 483 | 3-CH₃ | H | CH₂—C₆H₅ | CN, CO₂CH₃ |
| 484 | H | H | CH₃ | CO₂C₂H₅, CO₂C₂H₅ |
| 485 | H | H | CH₂CH(OH)CH₃ | —OC(=O)—C(CN)=C(C₆H₅)— |
| 486 | H | H | CH₂—C₆H₄—COOH | CN, CN |
| 487 | H | H | CH₂—C₆H₄—CO₂CH₃ | CN, CN |
| 488 | H | H | CH₂—C₆H₄—CO₂CH₃ | CN, CN |
| 489 | 3-CH₃ | 3'-CH₃ | CH₂—C₆H₄—CO₂CH₃ | CN, CO₂CH₂CH₂CN |

TABLE 11-continued

Structure: P\C=CH-[benzene(R)n, positions 2,3,4,5,6]-N(R1)-[benzene(R')n, positions 1',2',3',4',5',6']-CH=C/P with Q groups; N at position 1 and 1'.

| Example No. | (R)n | (R')n | R₁ | P, Q |
|---|---|---|---|---|
| 490 | 3-Cl₃ | 2'-CH₃ | CH₂–C₆H₄–CO₂CH₃ | CN, CO₂CH₂CH₂OC₂H₅ |
| 491 | 3-CH₃ | 3'-OCH₃ | CH₂–C₆H₄–CO₂CH₃ | CN, CN |
| 492 | 2,5-di-OCH₃ | H | CH₂–C₆H₄–CO₂CH₃ | CN, SO₂–C₆H₄–CH₃ |
| 493 | 2,5-di-CH₃ | H | CH₃ | CN, CO₂CH₃ |
| 494 | 3-Br | 3'-CH₃ | CH₃ | CN, CO₂CH₃ |
| 495 | H | H | C₂H₅ | CN, CO₂CH₃ |
| 496 | H | H | CH₂CH(CH₃)₂ | CN, CO₂CH₃ |
| 497 | H | H | CH₂C₆H₅ | CN, CO₂CH₃ |
| 498 | H | H | CH₂CH₂SO₂C₆H₅ | CN, CO₂CH₃ |
| 499 | H | H | CH₂CH₂CN | CN, CO₂CH₃ |
| 500 | H | H | CH₂CH₂OC₆H₅ | CN, CO₂CH₃ |
| 501 | H | H | CH₂CH₂S–C(=N–)–S (benzothiazole, 2-methyl) | CN, CO₂CH₃ |
| 502 | H | H | CH₂CH₂N(phthalimide) | CN, CO₂CH₃ |
| 503 | H | H | CH₂CH₂–N(CO)(SO₂)–C₆H₄ (saccharin-type) | CN, CO₂CH₃ |
| 504 | H | H | CH₂CH₂N(C₂H₄OH)SO₂C₆H₅ | CN, CO₂CH₃ |
| 505 | H | H | CH₂CH₂SO₂NH–C₆H₅ | CN, CO₂CH₃ |

TABLE 11-continued

Structure: P(Q)C=CH-[phenyl(R)n]-N(R1)-[phenyl(R')n]-CH=C(P)Q, with positions 5,6,4,3,2,1 and 1',2',3',4',5',6'

| Example No. | (R)n | (R')n | R₁ | P, Q |
|---|---|---|---|---|
| 506 | H | H | CH₂-C₆H₅ | $-O-\overset{O}{\underset{\parallel}{C}}-C=\overset{COOH}{\underset{C_6H_5}{C}}-$ |
| 507 | H | H | CH₂-C₆H₄-OC₂H₅ | CN, CO₂CH₂CH₂OH |
| 508 | H | H | CH₂-C₆H₄-Cl | CN, CONHC₂H₄OH |

TABLE 12

Structure: A-CH=C(P)-[phenyl(R)n]-C(P)=CH-A, with positions 3,2,1,6,5,4

| Example No. | A | (R)n | P |
|---|---|---|---|
| 509 | (HOC₂H₄)₂N-C₆H₄- | H | CN |
| 510 | (CH₃COC₂H₄)₂N-C₆H₃(CH₃)- | H | CN |
| 511 | (C₂H₅)(CH₃COCH₂CH₂)N-C₆H₃(CH₃)- | H | CN |
| 512 | (CH₃)₂N-C₆H₄- | H | CO₂CH₃ |
| 513 | (C₂H₅)(C₆H₅CH₂)N-C₆H₄- | H | CO₂CH₃ |
| 514 | (C₆H₁₁)(C₂H₅)N-C₆H₄- | 2-CH₃ | CO₂CH₃ |

TABLE 12-continued

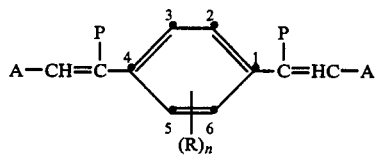

| Example No. | A | (R)$_n$ | P |
|---|---|---|---|
| 515 | [structure: N-phenyl with NCCH$_2$CH$_2$ and CH$_3$COOCH$_2$CH$_2$ substituents] | 2-Cl | CONH$_2$ |
| 516 | [structure: substituted phenyl with CH$_3$, CH(CH$_3$)$_2$, N-C$_2$H$_4$OH] | H | CN |
| 517 | [structure: dimethylphenyl with CH$_3$, (CH$_3$)$_2$, N-C$_2$H$_4$OCCH$_3$(=O)] | 2,5-di-CH$_3$ | CN |
| 518 | [structure: methylphenyl with OCH$_3$ and N-C$_2$H$_4$OCCH$_3$(=O)] | H | CN |
| 519 | [structure: methylphenyl with O linkage and N-CH$_2$-phenyl-CO$_2$CH$_3$] | H | CN |
| 520 | [structure: indole with C$_6$H$_5$ and N-C$_2$H$_4$OH] | H | CN |
| 521 | [structure: C$_6$H$_5$, S, N, C$_2$H$_5$, N-C$_2$H$_4$OCCH$_3$(=O)] | 2-OCH$_3$ | CN |

TABLE 12-continued
A—CH=C(P)— [benzene ring with positions 2,3,4,5,6, (R)ₙ] —C(P)=HC—A
| Example No. | A | (R)ₙ | P |
|---|---|---|---|
| 522 | 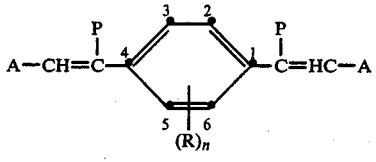 | H | CO₂CH₃ |
| 523 | 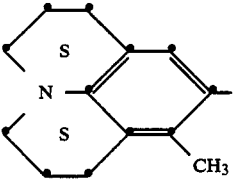 | H | CO₂CH₃ |
| 524 | 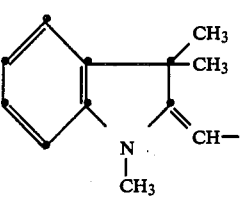 | H | CN |
| 525 |  | H | CN |
| 526 | 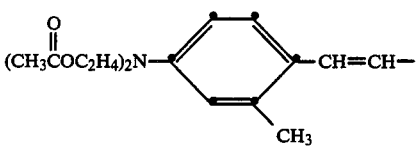 | H | CO₂CH₃ |
| 527 | 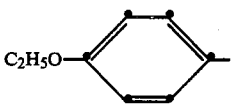 | H | CN |
| 528 | 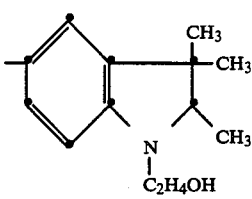 | H | CN |
| 529 | 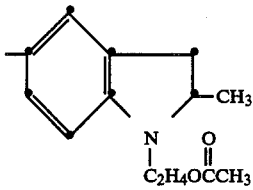 | H | CN |

TABLE 12-continued

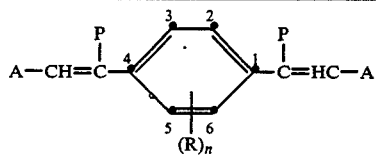

| Example No. | A | (R)$_n$ | P |
|---|---|---|---|
| 530 | HO—⟨phenyl⟩— | H | CO$_2$CH$_3$ |
| 531 | (phenyl)(CH$_2$CH$_2$OH)N—⟨phenyl⟩— | H | CN |
| 532 | (CH$_3$COCH$_2$CH$_2$)$_2$N—⟨phenyl⟩— (C=O) | H | SO$_2$CH$_3$ |
| 533 | (CH$_3$COCH$_2$CH$_2$)$_2$N—⟨phenyl⟩— (C=O) | H | SO$_2$—⟨phenyl⟩ |

TABLE 13

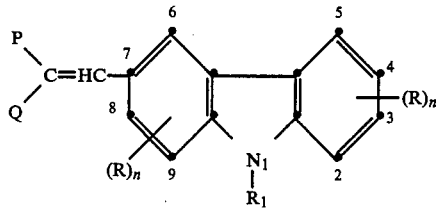

| Example No. | (R)$_n$ | R$_1$ | P, Q |
|---|---|---|---|
| 534 | H | C$_2$H$_4$OH | CN, CN |
| 535 | H | C$_2$H$_4$OH | CN, SO$_2$CH$_3$ |
| 536 | H | C$_2$H$_4$OH | CN, SO$_2$C$_6$H$_5$ |
| 537 | H | C$_2$H$_4$OH | CN, CONHC$_6$H$_5$ |
| 538 | H | C$_2$H$_4$OH | CN, CONHC$_2$H$_4$OH |
| 539 | H | CH$_2$CH$_2$OCCH$_3$ (C=O) | CN, CN |
| 540 | H | CH$_2$CH$_2$OCCH$_3$ (C=O) | CN, SO$_2$CH$_3$ |
| 541 | 4,8-di-CH$_3$ | CH$_2$CH$_2$OCCH$_3$ (C=O) | CN, CO$_2$CH$_3$ |
| 542 | 8-CH$_3$ | CH$_2$CH$_2$OC—C$_6$H$_5$ (C=O) | CN, CO$_2$CH$_3$ |
| 543 | 8-CH$_3$ | CH$_2$CH$_2$OCCH$_3$ (C=O) | —OC—C=C—C$_6$H$_5$ (with CN) (C=O) |
| 544 | 8-CH$_3$ | CH$_2$CH(OH)CH$_3$ | —OC—C=C—C$_6$H$_5$ (with COOH) (C=O) |

TABLE 13-continued

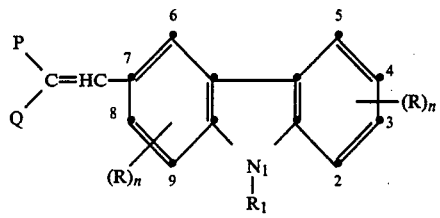

| Example No. | (R)n | R₁ | P, Q |
|---|---|---|---|
| 545 | 2-Cl—8-CH₃ | CH₃CH₂OCH₂CH₂OC(O)CH₃ | −OC(O)−C(CONH₂)=C−C₆H₅ |
| 546 | 4-Cl—8-CH₃ | −CH₂−C₆H₄−COOH | CN, CO₂CH₃ |
| 547 | 8-CH₃ | −CH₂−C₆H₄−CO₂CH₃ | CN, CN |
| 548 | 8-CH₃ | C₆H₅ | CN, CO₂CH₃ |
| 549 | H | −CH₂−C₆H₄−COOH | CN, CO₂CH₃ |
| 550 | 4-OCH₃—8-CH₃ | −CH₂−C₆H₄−COCl | CN, CN |
| 551 | 3,4-di-Cl—8-CH₃ | CH₂CH₂OC(O)CH₃ | phthaloyl (−C(O)−C₆H₄−C(O)−) |
| 552 | H | −C₆H₄−CO₂CH₃ | CN, CO₂CH₃ |
| 553 | H | CH₂CH₂N(CH₃)SO₂CH₃ | CN, CO₂CH₃ |
| 554 | 6,8-di-CH₃ | CH₂CH₂OC(O)NHC₆H₅ | CN, CO₂CH₃ |
| 555 | 6,9-di-CH₃ | CH₂CH₂Cl | CN, CO₂CH₃ |
| 556 | 8-CH₃ | CH₂CH₂OC₆H₅ | CN, CO₂CH₃ |
| 557 | 8-CH₃ | CH₂CH₂SC₆H₅ | CN, CO₂CH₃ |
| 558 | 4-OCH₃—8-CH₃ | CH₂CH₂S−C(=N−)−S (benzothiazolyl with 2-CH₃) | CN, COOH |

TABLE 13-continued

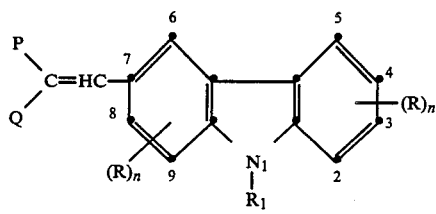

| Example No. | (R)$_n$ | R$_1$ | P, Q |
|---|---|---|---|
| 559 | 8-CH$_3$ | CH$_2$CH$_2$SO$_2$—⟨C$_6$H$_4$⟩—CH$_3$ | CN, CO$_2$CH$_3$ |
| 560 | 8-CH$_3$ | CH$_2$CH$_2$N(phthalimide) | CN, CO$_2$CH$_3$ |
| 561 | 8-CH$_3$ | —CH$_2$CH$_2$N(saccharin) | CN, CO$_2$CH$_3$ |
| 562 | 8-CH$_3$ | —CH$_2$CH=CH$_2$ | CN, CO$_2$CH$_3$ |
| 563 | 8-CH$_3$ | —CH$_2$CH$_2$OC$_2$H$_4$OH | CN, CN |
| 564 | 8-CH$_3$ | —CH$_2$CH$_2$SO$_2$CH=CH$_2$ | CN, CO$_2$CH$_3$ |
| 565 | 8-CH$_3$ | —CH$_2$CH(OH)CH$_2$OH | CN, COC(CH$_3$)$_2$ |
| 566 | 9-CH$_3$ | —CH$_2$C$_6$H$_{11}$ | CN, CO$_2$CH$_3$ |
| 567 | 9-CH$_3$ | —CH$_2$CH$_2$SO$_2$N(CH$_3$)$_2$ | CN, CO$_2$CH$_3$ |
| 568 | 9-CH$_3$ | —CH$_2$CH$_2$CON(CH$_3$)C$_6$H$_5$ | CN, CO$_2$CH$_3$ |
| 569 | 4-CH$_3$ | —CH$_2$CH$_2$OCOCH$_2$Cl | CN, CO$_2$CH$_3$ |
| 570 | 4-CH$_3$ | —CH$_2$CH$_2$OCOCH$_3$ | CN, —C(=N—)—O— (5-Cl-2-CH$_3$-benzoxazole) |
| 571 | 4-CH$_3$ | —CH$_2$CH$_2$OCOCH$_3$ | CN, —C(=N—)—NH— (CH$_3$-benzimidazole) |
| 572 | 4-CH$_3$ | —CH$_2$CH$_2$OCOCH$_3$ | CN, —C(=N—)—S— (benzothiazole) |

TABLE 13-continued
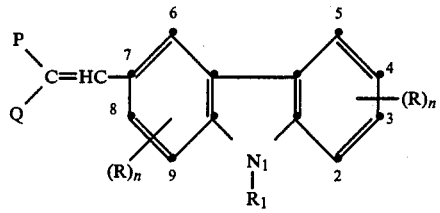
| Example No. | (R)n | R1 | P, Q |
|---|---|---|---|
| 573 | 2-CH3, 8-OCH3 | CH2CH2N(C(O)N(CH3)CH2C(O)) (succinimide-like with N-CH3) | CN, CO2CH3 |
| 574 | 4,8-di-OCH3 | CH2CH2N(C(O)S CH2C(O)) | CN, CO2CH3 |
| 575 | 6,9-di-CH3 | CH2CH2—S—(pyrimidinyl) | CN, CO2CH3 |
TABLE 14
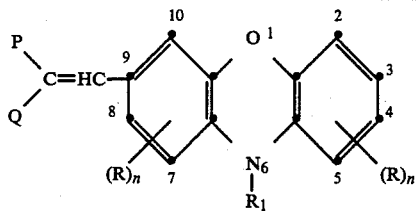
| Example No. | (R)n | R1 | P, Q |
|---|---|---|---|
| 576 | H | C2H4OH | CN, CN |
| 577 | H | C2H4OH | CN, SO2CH3 |
| 578 | H | —C6H4—COOH | CN, SO2C6H5 |
| 579 | H | —CH2—C6H4—COOH | CN, CONHC6H5 |
| 580 | H | C2H4OH | CN, CONHC2H4OH |
| 581 | H | CH2CH2OC(O)CH3 | CN, CN |
| 582 | H | CH2CH2OC(O)CH3 | CN, SO2CH3 |

TABLE 14-continued

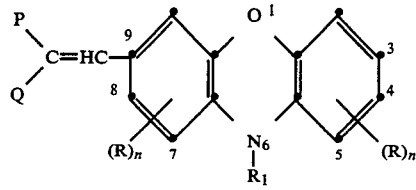

| Example No. | (R)$_n$ | R$_1$ | P, Q |
|---|---|---|---|
| 583 | 8-CH$_3$ | CH$_2$CH$_2$OC(O)CH$_3$ | CN, CO$_2$CH$_3$ |
| 584 | 8-CH$_3$ | CH$_2$CH$_2$OC(O)—C$_6$H$_5$ | CN, CO$_2$CH$_3$ |
| 585 | 8-CH$_3$ | CH$_2$CH$_2$OCCH$_3$ (O) | —OC(O)—C(CN)=C(C$_6$H$_5$)— |
| 586 | 8-CH$_3$ | CH$_2$CH(OH)CH$_3$ | —OC(O)—C(COOH)=C(C$_6$H$_5$)— |
| 587 | 2-Cl—8-CH$_3$ | CH$_2$CH$_2$OCH$_2$CH$_2$OC(O)CH$_3$ | —OC(O)—C(CONH$_2$)=C(C$_6$H$_5$)— |
| 588 | 4-Cl—8-CH$_3$ | —C$_6$H$_4$—COOH | CN, CO$_2$CH$_3$ |
| 589 | 5,8-di-CH$_3$ | —CH$_2$—C$_6$H$_4$—CO$_2$CH$_3$ | CN, CN |
| 590 | H | C$_6$H$_5$ | CN, CO$_2$CH$_3$ |
| 591 | H | —CH$_2$—C$_6$H$_4$—COOH | CN, CO$_2$CH$_3$ |
| 592 | H | —CH$_2$—C$_6$H$_4$—COCl | CN, CN |
| 593 | 3-CH$_3$ | CH$_2$CH$_2$OCCH$_3$ (O) | phthaloyl (−C(O)−C$_6$H$_4$−C(O)−) |
| 594 | 3-CH$_3$ | —C$_6$H$_4$—COOH | CN, CO$_2$CH$_3$ |
| 595 | 3-CH$_3$ | CH$_2$CH$_2$N(CH$_3$)SO$_2$CH$_3$ | CN, CO$_2$CH$_3$ |
| 596 | 3-OCH$_3$—8-CH$_3$ | CH$_2$CH$_2$OC(O)NHC$_6$H$_5$ | CN, CO$_2$CH$_3$ |

TABLE 14-continued

| Example No. | (R)$_n$ | R$_1$ | P, Q |
|---|---|---|---|
| 597 | 3-OCH$_3$—7-CH$_3$ | CH$_2$CH$_2$Cl | CN, CO$_2$CH$_3$ |
| 598 | 3-OCH$_3$—7-CH$_3$ | CH$_2$CH$_2$OC$_6$H$_5$ | CN, CO$_2$CH$_3$ |
| 599 | 3-OCH$_3$—7-CH$_3$ | CH$_2$CH$_2$SC$_6$H$_5$ | CN, CO$_2$CH$_3$ |
| 600 | 3,5-di-CH$_3$ | CH$_2$CH$_2$S–C(=N–)–S– (benzothiazole with CH$_3$) | CN, COOH |
| 601 | 3,5-di-CH$_3$ | CH$_2$CH$_2$SO$_2$–C$_6$H$_4$–CH$_3$ | CN, CO$_2$CH$_3$ |
| 602 | 3-OCH$_3$ | CH$_2$CH$_2$N(phthalimido) | CN, CO$_2$CH$_3$ |
| 603 | 7,10-di-CH$_3$ | —CH$_2$CH$_2$N(CO–)(SO$_2$–) (saccharin-type) | CN, CO$_2$CH$_3$ |
| 604 | 3,8-di-CH$_3$ | —CH$_2$CH=CH$_2$ | CN, CO$_2$CH$_3$ |
| 605 | 3,8-di-OCH$_3$ | —CH$_2$CH$_2$OC$_2$H$_4$OH | CN, CN |
| 606 | 8-OCH$_3$ | —CH$_2$CH$_2$SO$_2$CH=CH$_2$ | CN, CO$_2$CH$_3$ |
| 607 | 8-Cl | —CH$_2$CH(OH)CH$_2$OH | CN, COC(CH$_3$)$_2$ |
| 608 | 8-CH$_3$ | —CH$_2$C$_6$H$_{11}$ | CN, CO$_2$CH$_3$ |
| 609 | 8-CH$_3$ | —CH$_2$CH$_2$SO$_2$N(CH$_3$)$_2$ | CN, CO$_2$CH$_3$ |
| 610 | 8-CH$_3$ | —CH$_2$CH$_2$CON(CH$_3$)C$_6$H$_5$ | CN, CO$_2$CH$_3$ |
| 611 | H | —CH$_2$CH$_2$OC(O)CH$_2$Cl | CN, CO$_2$CH$_3$ |
| 612 | H | —CH$_2$CH$_2$OC(O)CH$_3$ | CN, —C(=N–)–O– (benzoxazole with Cl, CH$_3$) |
| 613 | H | —CH$_2$CH$_2$OC(O)CH$_3$ | CN, —C(=N–)–NH– (benzimidazole) |

TABLE 14-continued

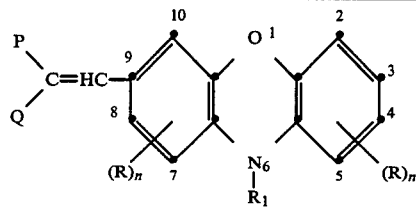

| Example No. | (R)$_n$ | R$_1$ | P, Q |
|---|---|---|---|
| 614 | 5,8-di-CH$_3$ | —CH$_2$CH$_2$OCCH$_3$ (with C=O) | CN, —C(=N)—S— (benzothiazolyl) |
| 615 | 5,8-di-CH$_3$ | CH$_2$CH$_2$N in ring with C(=O)—N(CH$_3$)—C(=O)—CH$_2$ | CN, CO$_2$CH$_3$ |
| 616 | 8-CH$_3$ | CH$_2$CH$_2$N in ring with C(=O)—S—CH$_2$—C(=O) | CN, CO$_2$CH$_3$ |
| 617 | 7,9-di-OCH$_3$ | CH$_2$CH$_2$—S— (pyrimidinyl) | CN, CO$_2$CH$_3$ |

TABLE 15

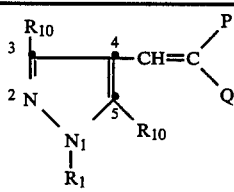

| Example No. | R$_1$ | R$_{10}$ | P, Q |
|---|---|---|---|
| 618 | —C$_6$H$_4$—COOH | 3,5-di-CH$_3$ | CN, CN |
| 619 | —CH$_2$—C$_6$H$_4$—COOH | 3,5-di-C$_6$H$_5$ | CN, SO$_2$CH$_3$ |
| 620 | —C$_6$H$_4$—OC$_2$H$_4$OH | 5-CH$_3$ | CN, SO$_2$C$_6$H$_5$ |

TABLE 15-continued

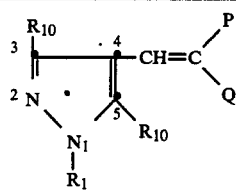

| Example No. | $R_1$ | $R_{10}$ | P, Q |
|---|---|---|---|
| 621 | —C₆H₄—C₂H₄OH | 3-CH₃ | CN, CONHC₆H₅ |
| 622 | —C₆H₄—COOH | 3-C₆H₅ | CN, CONHC₂H₄OH |
| 623 | —CH₂—C₆H₄—COOH | 3-C₆H₅ | CN, CN |
| 624 | —CH₂—C₆H₄—CO₂CH₃ | 3,5-di-C₆H₄—p-CH₃ | CN, SO₂CH₃ |
| 625 | —C₆H₄—CO₂CH₃ | 3,5-di-C₆H₄—p-Cl | CN, CO₂CH₃ |
| 626 | C₆H₅ | 3,5-di-C₆H₄—p-COOH | CN, CO₂CH₃ |
| 627 | C₂H₄OH | 3,5-di-di-C₆H₄—p-OCH₃ | —OC(O)—C(CN)=C—C₆H₅ |
| 628 | C₂H₄OH | 3,5-di-CH₃ | —OC(O)—C(COOH)=C—C₆H₅ |
| 629 | CH₂CH₂OC(O)CH₃ | 3-C₆H₅ | CN, CN |
| 630 | CH₂CH₂OC(O)CH₃ | 3-C₆H₅ | CN, CO₂CH₃ |
| 631 | CH₂CH₂OC(O)CH₃ | 3-C₆H₄—p-CH₃ | CN, SO₂CH₃ |
| 632 | CH₂CH₂OC(O)C₆H₅ | 3,5-di-CH₃ | CN, CO₂C₂H₅ |
| 633 | CH₂CH₂OC(O)CH₃ | 3,5-di-CH₃ | —OC(O)—C(CN)=C(C₆H₅) |

TABLE 15-continued

Structure: pyrazole ring with N2=C3(R10)-C4(=CH-C(P)(Q))-C5(R10)=N1-R1

| Example No. | R1 | R10 | P, Q |
|---|---|---|---|
| 634 | CH2CH(OH)CH3 | 3,5-di-CH3 | phthaloyl (−C(=O)−C6H4−C(=O)−) |
| 635 | CH2CH2OCH2CH2OC(=O)CH3 | 3,5-di-CH3 | −OC(=O)−C(CONH2)=C(C6H5)− |
| 636 | CH2C6H5 | 3,5-di-CH3 | CN, CO2CH3 |
| 637 | CH2−C6H4−CO2CH3 | 3,5-di-C6H5 | CN, CN |
| 638 | C6H5 | 5-CH3 | CN, CO2CH3 |
| 639 | CH2−C6H4−COOH | 3-CH3 | CN, CO2CH3 |
| 640 | CH2−C6H4−COCl | 3-C6H5 | CN, CN |
| 641 | CH2CH2OC(=O)CH3 | 3-C6H5 | phthaloyl (−C(=O)−C6H4−C(=O)−) |
| 642 | C6H5 | 3,5-di-C6H4—p-CH3 | CN, CO2CH3 |
| 643 | CH2CH2N(CH3)SO2CH3 | 3,5-di-C6H4—p-Cl | CN, CO2CH3 |
| 644 | C6H4−C2H4OH | 3,5-di-C6H4—p-COOH | CN, CO2CH3 |
| 645 | C6H4−CH3 | 3,5-di-di-C6H4—p-OCH3 | CN, CO2CH3 |
| 646 | CH2CH2OC6H5 | 3,5-di-CH3 | CN, CO2CH3 |
| 647 | CH2CH2SC6H5 | 3-C6H5 | CN, CO2CH3 |

TABLE 15-continued

[Structure: R10 at position 3, R10 at position 5, N at position 2, N1-R1, with CH=C(P)(Q) at position 4]

| Example No. | R₁ | R₁₀ | P, Q |
|---|---|---|---|
| 648 | CH₂CH₂S—[2-methylbenzothiazol-... group] | 3-C₆H₅ | CN, COOH |
| 649 | CH₂CH₂SO₂—[4-methylphenyl] | 3-C₆H₄—p-CH₃ | CN, CO₂CH₃ |
| 650 | CH₂CH₂N—[phthalimido] | 3,5-di-CH₃ | CN, CO₂CH₃ |
| 651 | —CH₂CH₂N—[saccharinyl (benzisothiazol-3-one 1,1-dioxide)] | 3,5-di-CH₃ | CN, CO₂CH₃ |
| 652 | —CH₂CH=CH₂ | 3,5-di-CH₃ | CN, CO₂CH₃ |
| 653 | —CH₂CH₂OC₂H₄OH | 3,5-di-CH₃ | CN, CN |
| 654 | —CH₂CH₂SO₂CH=CH₂ | 3,5-di-C₆H₅ | CN, CO₂CH₃ |
| 655 | —CH₂CH(OH)CH₂OH | 5-CH₃ | CN, COC(CH₃)₂ |
| 656 | —CH₂C₆H₁₁ | 3-CH₃ | CN, CO₂CH₃ |
| 657 | —CH₂CH₂SO₂N(CH₃)₂ | 3-C₆H₅ | CN, CO₂CH₃ |
| 658 | —CH₂CH₂CON(CH₃)C₆H₅ | 3-C₆H₅ | CN, CO₂CH₃ |
| 659 | —CH₂CH₂OCOCH₂Cl | 3,5-di-C₆H₄—p-CH₃ | CN, CO₂CH₃ |
| 660 | —CH₂CH₂OCOCH₃ | 3,5-di-C₆H₄—p-Cl | CN, —C(=N—)O— [5-chloro-2-methylbenzoxazol-like] |
| 661 | —CH₂CH₂OCOCH₃ | 3,5-di-C₆H₄—p-COOH | CN, —C(=N—)NH— [benzimidazolyl] |
| 662 | —CH₂CH₂OCOCH₃ | 3,5-di-di-C₆H₄—p-OCH₃ | CN, —C(=N—)S— [benzothiazolyl] |

TABLE 15-continued

Structure: pyrazole ring with N2-N1(R1), C3=R10, C4-CH=C(P)(Q), C5-R10

| Example No. | R1 | R10 | P, Q |
|---|---|---|---|
| 663 | CH2CH2N bonded to succinimide-like ring: C(=O)-N(CH3)-C(=O)-CH2 | 3,5-di-CH3 | CN, CO2CH3 |
| 664 | CH2CH2N bonded to ring: C(=O)-S-C(=O)-CH2 | 3-C6H5 | CN, CO2CH3 |
| 665 | CH2CH2-S-(pyrimidin-2-yl) | 3-C6H5 | CN, CO2CH3 |

TABLE 16

Structure: pyrrole ring with (R)n substituents, N1-R1, C2-CH=C(P)(Q)

| Example No. | (R)n | R1 | P, Q |
|---|---|---|---|
| 666 | H | CH2CH2OH | CN, CN |
| 667 | H | CH2CH2OH | CN, CO2CH3 |
| 668 | H | CH2CH2OCCH3 (O=C) | −OC(=O)−C(CN)=C(C6H5) |
| 669 | 5-CH3 | CH3 | −OC(=O)−C(COOH)=C(C6H5) |
| 670 | 3-CH3 | H | −OC(=O)−C(CO2CH3)=C(C6H5) |
| 671 | H | CH2C6H4—p-COOH | −OC(=O)−C(CN)=C(C6H5) |

TABLE 16-continued

Structure: pyrrole ring with N-R₁, (R)ₙ substituents at positions 3,4,5, and position 2 bearing -CH=C(P)(Q)

| Example No. | (R)ₙ | R₁ | P, Q |
|---|---|---|---|
| 672 | H | -C₆H₄-CO₂CH₃ (para) | -OC(O)-C(CN)=C(C₆H₅)- |
| 673 | H | CH₂CH₂OH | -OC(O)-C(CN)=C(C₆H₅)- |
| 674 | H | CH₂-C₆H₄-CO₂CH₃ (para) | phthaloyl (-C(O)-C₆H₄-C(O)-) |
| 675 | H | CH₂CH₂CN | CN, CO₂CH₃ |
| 676 | H | CH₂CH₂Cl | CO₂CH₃, CO₂CH₃ |
| 677 | 5-CH₂OH | C₂H₅ | -OC(O)-C(CN)=C(C₆H₅)- |
| 678 | 5-CH₂OCCH₃ (O) | C₂H₅ | -OC(O)-C(CN)=C(C₆H₅)- |
| 679 | 5-CH₂OH | C₂H₄OH | CN, CN |
| 680 | H | H | CN, CO₂CH₃ |
| 681 | H | CH₂C₆H₅ | CN, CONHC₂H₄OH |
| 682 | 5-CH₃ | C₄H₉—n | CN, CO₂C₂H₄OH |
| 683 | 3,4-di-Br | CH₃ | CN, CO₂C₂H₅ |
| 684 | 4,5-di-CH₃ | H | -OC(O)-C(COOH)=C(C₆H₅)- |
| 685 | 3,4-di-CH₃ | H | -OC(O)-C(COOH)=C(C₆H₅)- |
| 686 | H | C₆H₅ | CO₂C₂H₅, SO₂CH₃ |
| 687 | 3,5-di-C₆H₅ | H | CN, CO₂CH₃ |
| 688 | H | C₆H₄—p-OCH₃ | CN, CO₂CH₃ |
| 689 | 5-OCH₃, 3-CH₃, 4-C₆H₅ | H | CN, CO₂CH₃ |
| 690 | 4-OCH₃, 5-CH₃ | CH₃ | CN, CO₂CH₃ |
| 691 | H | CH₂CH(OH)CH₃ | -OC(O)-C(CN)=C(C₆H₅)- |
| 692 | H | CH₂CH(OH)C₆H₅ | -OC(O)-C(CN)=C(C₆H₅)- |
| 693 | H | CH₂CH₂CH₂NHCOCH₃ | CN, CO₂CH₃ |
| 694 | H | CH₂CH₂OH | CN, SO₂CH₃ |
| 695 | H | CH₂CH₂OH | CN, SO₂C₆H₅ |

TABLE 16-continued

[Structure: pyrrole ring with (R)n at position 3-4, N-R1, and CH=C(P)(Q) substituent at position 2]

| Example No. | (R)n | R1 | P, Q |
|---|---|---|---|
| 696 | H | CH2CH2OH | CN, COC(CH3)3 |
| 697 | H | C6H11 | CN, CO2CH2C6H5 |
| 698 | H | CH2CH2OC(O)CH3 | CN, COC6H5 |
| 699 | H | CH2CH2OC(O)CH3 | CN, benzoxazol-2-yl (5-Cl) |
| 700 | H | CH2CH2OC(O)CH3 | CN, benzothiazol-2-yl |
| 701 | H | CH2CH2OC(O)CH3 | CN, benzimidazol-2-yl |
| 702 | H | CH2CH2OC(O)CH3 | CN, SO2-(2,5-dichlorophenyl) |
| 703 | H | CH2CH2OC(O)CH3 | CN, SO2-(4-CO2CH3-phenyl) |
| 704 | H | CH3 | —OC(O)—, CN, =C(CH3)-(4-CO2CH3-phenyl) |

TABLE 17

[Structure: pyrrole ring with (R)n and CH=C(P)(Q) substituent at position 3]

| Example No. | (R)n | R1 | P, Q |
|---|---|---|---|
| 705 | 2,5-di-CH3 | CH3 | CN, CO2CH3 |

TABLE 17-continued

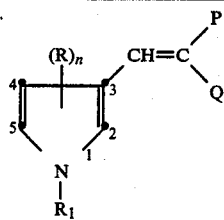

| Example No. | (R)$_n$ | R$_1$ | P, Q |
|---|---|---|---|
| 706 | H | H | $-O\overset{O}{\underset{\|}{C}}-\overset{COOH}{\underset{\|}{C}}=C\overset{C_6H_5}{\diagdown}$ |
| 707 | H | CH$_2$C$_6$H$_5$ | $-O\overset{O}{\underset{\|}{C}}-\overset{CONH_2}{\underset{\|}{C}}=C\overset{C_6H_5}{\diagdown}$ |
| 708 | H | CH$_2$C$_6$H$_4$—p-CO$_2$CH$_3$ | $-O\overset{O}{\underset{\|}{C}}-\overset{CN}{\underset{\|}{C}}=C\overset{C_6H_5}{\diagdown}$ |
| 709 | H | CH$_2$—C$_6$H$_4$—COOH | $-O\overset{O}{\underset{\|}{C}}-\overset{CN}{\underset{\|}{C}}=C\overset{C_6H_5}{\diagdown}$ |
| 710 | 2,5-di-CH$_3$ | C$_6$H$_5$ | CN, CO$_2$CH$_3$ |
| 711 | 2,5-di-CH$_3$ | C$_6$H$_4$—p-COOH | $-O\overset{O}{\underset{\|}{C}}-\overset{CN}{\underset{\|}{C}}=C\overset{C_6H_5}{\diagdown}$ |
| 712 | H | C$_6$H$_4$—p-Cl | CN, CONHC$_2$H$_4$OH |
| 713 | 2,4-di-C$_6$H$_5$ | C$_6$H$_{11}$ | CN, CONH—C$_6$H$_4$—CO$_2$CH$_3$ |
| 714 | 2-CH$_3$ | H | CN, SO$_2$—C$_6$H$_4$—CO$_2$CH$_3$ |
| 715 | 2,5-di-C$_6$H$_5$ | H | CN, CO$_2$CH$_2$CH$_2$CH$_2$OCH$_3$ |
| 716 | 2,4,5-tri-C$_6$H$_5$ | H | CN, CO$_2$C$_6$H$_{11}$ |
| 717 | 2-Cl, 5-C$_6$H$_5$ | CH$_3$ | CN, CO$_2$CH$_2$CH$_2$OH |
| 718 | 2,5-di-CH$_3$ | C$_6$H$_{11}$ | CN, SO$_2$CH$_2$CH$_2$CH$_2$OH |
| 719 | 2-C$_6$H$_5$ | C$_6$H$_5$ | CN, CO$_2$C$_6$H$_5$ |
| 720 | 2,5-di-CH$_3$ | CH$_2$CH$_2$OH | $-O\overset{O}{\underset{\|}{C}}-\overset{CN}{\underset{\|}{C}}=C\overset{C_6H_5}{\diagdown}$ |
| 721 | 2,5-di-CH$_3$ | CH$_2$CH$_2$OH | phthaloyl |

TABLE 17-continued

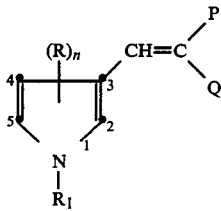

| Example No. | (R)$_n$ | R$_1$ | P, Q |
|---|---|---|---|
| 722 | 2,5-di-CH$_3$ | CH$_2$CH$_2$OH | CN, 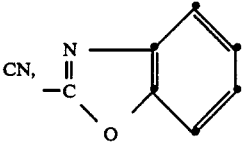 |
| 723 | 2,5-di-CH$_3$ | CH$_2$CH$_2$OCCH$_3$ (O=) | CN, CN |
| 724 | 2,5-di-CH$_3$ | CH$_2$CH$_2$OCCH$_3$ (O=) | CN, SO$_2$CH$_3$ |
| 725 | 2,5-di-CH$_3$ | CH$_2$CH$_2$OCCH$_3$ (O=) | CN, COC(CH$_3$)$_3$ |
| 726 | 2,5-di-CH$_3$ | CH$_2$CH$_2$OCCH$_3$ (O=) | CN, COC$_6$H$_5$ |
| 727 | 2,5-di-CH$_3$ | CH$_2$CH$_2$OCCH$_3$ (O=) | CN, 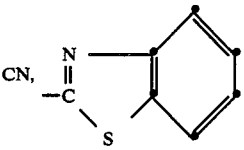 |
| 728 | 2,5-di-CH$_3$ | CH$_2$CH(OCCH$_3$)CH$_3$ (O=) | 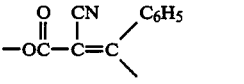 |
| 729 | 2,5-di-CH$_3$ | CH$_2$CH$_2$O——CO$_2$CH$_3$ | CN, CN |
| 730 | 2,5-di-CH$_3$ | CH$_2$CH$_2$Cl | CN, CO$_2$CH$_3$ |
| 731 | 2,5-di-CH$_3$ | CH$_2$CH$_2$—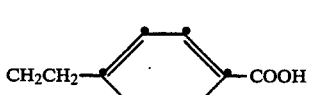—COOH | 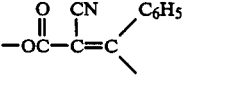 |
| 732 | 2,5-di-CH$_3$ | C$_6$H$_5$ | —CN, 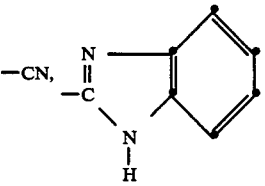 |
| 733 | 2,5-di-CH$_3$ | CH$_2$CH$_2$CO$_2$CH$_3$ | CN, SO$_2$C$_6$H$_5$ |
| 734 | 2,5-di-CH$_3$ | CH$_2$CH$_2$CH$_2$OCH$_3$ | CN, CONH——CO$_2$CH$_3$ |

TABLE 17-continued

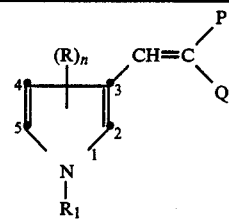

| Example No. | (R)$_n$ | R$_1$ | P, Q |
|---|---|---|---|
| 735 | 2,5-di-CH$_3$ | CH$_2$CH$_2$CN | —OC(=O)—C(CO$_2$CH$_3$)=C(C$_6$H$_5$) |

TABLE 18

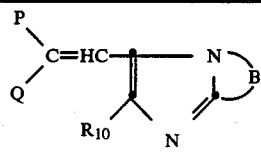

| Example No. | (R)$_{10}$ | B | P, Q |
|---|---|---|---|
| 736 | C$_6$H$_5$ | —CH=CH—S— | CN, CO$_2$CH$_3$ |
| 737 | H | —CCH$_3$=CH—S— | —OC(=O)—C(COOH)=C(C$_6$H$_5$) |
| 738 | CH$_3$ | —C(C$_6$H$_5$)=CH—S— | CO$_2$CH$_3$, CO$_2$CH$_3$ |
| 739 | (thiophene ring) | (benzene ring) | CN, CO$_2$CH$_3$ |
| 740 | C$_6$H$_5$ | —CH=CH—S— | CN, CO$_2$CH$_2$CH$_2$OH |
| 741 | C$_6$H$_4$—p-CO$_2$CH$_3$ | —CH=CH—S— | —OC(=O)—C(CN)=C(C$_6$H$_5$) |
| 742 | C$_6$H$_4$—p-COOH | —CH=CH—S— | —OC(=O)—C(CO$_2$CH$_3$)=C(C$_6$H$_5$) |
| 743 | C$_6$H$_4$—p-Br | (benzothiophene) | CN, CONHC$_2$H$_4$OH |

TABLE 18-continued

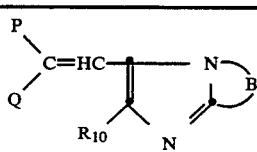

| Example No. | (R)$_{10}$ | B | P, Q |
|---|---|---|---|
| 744 | C$_6$H$_4$—p-OCH$_3$ | (methyl-COOH-substituted thiophene ring) | −OC(O)−C(CN)=C(C$_6$H$_5$)− |
| 745 | C$_6$H$_4$—p-CH$_3$ | (N=C(SC$_2$H$_5$)-thiophene) | CN, CO$_2$CH$_3$ |
| 746 | C$_6$H$_4$—o-Cl | −N=C(CH$_3$)−O− | CN, SO$_2$−C$_6$H$_4$−CO$_2$CH$_3$ |
| 747 | C$_6$H$_4$—m-CO$_2$CH$_3$ | (dimethyl-oxo-thiophene ring) | −OC(O)−C(CO$_2$CH$_3$)=C(C$_6$H$_5$)− |
| 748 | C$_6$H$_4$—p-CO$_2$CH$_3$ | (pyrrole ring) | −OC(O)−C(CO$_2$CH$_3$)=C(C$_6$H$_5$)− |
| 749 | C$_6$H$_5$ | (N=C(S—C$_2$H$_4$OH)-thiophene) | CN, CO$_2$CH$_3$ |
| 750 | C$_6$H$_5$ | (N=C(S—C$_2$H$_4$OCCH$_3$)-thiophene) | CN, CONHC$_2$H$_4$OH |
| 751 | C$_6$H$_5$ | (C$_2$H$_4$OH-substituted thiophene) | (phthaloyl) |
| 752 | C$_6$H$_5$ | (furan ring) | CN, CO$_2$CH$_3$ |

TABLE 18-continued structure with P/Q-C=HC-[ring]-N-B, R_10, N

| Example No. | $(R)_{10}$ | B | P, Q |
|---|---|---|---|
| 753 | $C_6H_5$ | (phenyl with N-H and CH₃ substituents, linked via S) | CN, CONH—⟨C₆H₄⟩—$C_2H_4OH$ |
| 754 | $C_6H_5$ | (thiazole with —CCH₃ and C—$CO_2C_2H_5$) | $-OC(O)-C(CN)=C(C_6H_5)\backslash$ |
| 755 | $C_6H_5$ | (thiazole linked to phenyl-$CO_2CH_3$) | $-OC(O)-C(CN)=C(C_6H_5)\backslash$ |
| 756 | $C_6H_5$ | (thiazole linked to phenyl-$CO_2CH_3$) | CN, —C(=O)— attached to (N=, Cl-phenyl) |

Typical colored polyesters prepared in accordance with this invention are given in the examples below.

The inherent viscosities (I.V.) of each of the colored copolyesters herein are determined according to ASTM D2857-70 procedure in a Wagner Viscometer of Lab Glass Inc. of Vineland, N.J. having a ½ ml. capillary bulb, using a polymer concentration of 0.5% by weight in 60/40 by weight, phenol/tetrachloroethane solvent. The procedure comprises heating the polymer/solvent system at 120° C. for 15 minutes to enhance dissolution of the polymer, cooling the solution to 25° C. and measuring the time of flow at 25° C. The I.V. is calculated from the equation $$(\eta)_{0.50\%}^{25°\,C.} = \frac{\ln \frac{t_s}{t_o}}{C}$$

where:

($\eta$)=Inherent viscosity at 25° C. at a polymer concentration of 0.5 g./100 ml. of solvent;
ln=Natural logarithm;
$t_s$=Sample flow time;
$t_o$=Solvent-blank flow time; and
C=Concentration of polymer in grams per 100 ml. of solvent=0.50.

EXAMPLE 757

A typical synthesis of poly(ethylene terephthalate) copolymerized with methine colorant is as follows. A total of 97 g (0.5 mol) dimethyl terephthalate, 62 g (1.0 mol) ethylene glycol, 0.0192 g (200 ppm) of the dye

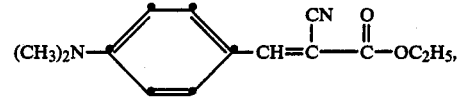

and 0.29 mL of a n-butanol solution of acetyl triisopropyl titanate which contains 0.03 g titanium per mL are weighed into a 500-mL, single-necked, round-bottom flask equipped with a nitrogen inlet, stirrer, vacuum outlet, and condensing flask. The flask and contents are heated at 200° C. in a Belmont metal bath for 60 minutes, at 210° C. for 75 minutes, and at 230° C. for 50 minutes with a nitrogen sweep over the reaction mixture while the ester interchange reaction takes place. The metal bath temperature is increased to 270° C. and vacuum, with a stream of nitrogen bleeding into the system, is applied slowly over a 10-minute period until reduced to 100 mm Hg. The flask and contents are then heated at 270° C. under this vacuum for 30 minutes, the metal bath temperature increased to 285° C., and the vacuum reduced slowly over a 10-minute period to 4 to 5 mm Hg. The flask and contents are heated at 285° C. under this vacuum for 25 minutes, the vacuum then reduced to 0.3 to 0.5 mm Hg and polycondensation continued at 285° C. for 16 minutes. The flask is removed from the metal bath and allowed to cool in nitrogen atmosphere while the polyester crystallizes. The resulting polymer is brilliant yellow and has an inherent viscosity of 0.58 measured as above. A UV visible spectrum on amorphous film of the polymer shows a strong absorption peak at 430 nm.

EXAMPLE 758

A typical synthesis of poly(ethylene terephthalate) copolymerized with 31 mol % 1,4-cyclohexanedimethanol and methine colorant is as follows. A total of 97 g (0.5 mol) dimethyl terephthalate, 23 g (0.16 mol) 1,4-cyclohexanedimethanol (70% trans isomer, 30% cis isomer), 52.1 g (0.84 m) ethylene glycol, 0.0217 g (200 ppm) of the dye

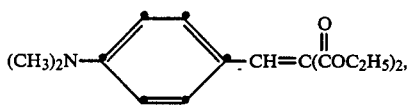

and 0.33 mL of a n-butanol solution of acetyl triisopropyl titanate which contains 0.03 g titanium per mL are weighed into a 500-mL, single-necked, round-bottom flask equipped with a nitrogen inlet, stirrer, vacuum outlet, and condensing flask. The flask and contents are heated at 200° C. for 35 minutes and at 225° C. for 70 minutes with a nitrogen sweep over the reaction mixture while the ester interchange reaction takes place. The metal bath temperature is increased to 270° C. and vacuum, with a stream of nitrogen bleeding into the system, is applied slowly over a 10-minute period until reduced to 100 mm Hg. The flask and contents are heated at 270° C. under a vacuum of 100 mm Hg for 30 minutes, the metal bath temperature is increased to 285° C. and the vacuum reduced slowly over a 10-minute period to 4 to 5 mm Hg. The flask and contents are heated at 285° C. under a vacuum of 4 to 5 mm Hg for 25 minutes, the vacuum is then reduced to 0.3 to 0.5 mm Hg, and polycondensation continued at 285° C. for 22 minutes. The flask is removed from the metal bath and allowed to cool in nitrogen atmosphere. The resulting amorphous polymer is light yellow when compression molded into a film of 15-mil thickness. A UV visible spectrum on amorphous film of the polymer shows a strong absorption at 385 nm. The resulting polymer has an inherent viscosity of 0.80 measured as above. Gas chromatographic analyses on a hydrolyzed sample of the polyester show that the polyester contains 30 mol % 1,4-cyclohexanedimethanol.

EXAMPLE 759

Preparation of Poly(ethylene terephthalate) Copolymerized With 3.5 Mol % 1,4-Cyclohexanedimethanol and Methine Colorant The compounds below are placed in a 500-mL, single-necked, round-bottom flask:
97 g (0.5 mol) dimethyl terephthalate;
2.52 g (0.0175 mol) 1,4-cyclohexanedimethanol (70% trans isomer, 30% cis isomer);
60.9 g (0.9825 mol) ethylene glycol;
0.0195 g (200 ppm)

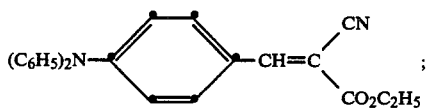

and 0.29 mL of a n-butanol solution of acetyl triisopropyl titanate containing 0.03 g titanium per mL. The ester interchange and polycondensation for this polymer are carried out as in Example 757. The resulting polymer is yellow colored and has an inherent viscosity of 0.70. Gas chromatographic analyses on a hydrolyzed sample of the polyester show that the polyester contains 3.5 mol % 1,4-cyclohexanedimethanol. A UV visible spectrum on amorphous film of the polymer shows a strong absorption peak at 435 nm.

EXAMPLE 760

Preparation of Green Polyester for Blowing Into Bottles

A synthesis of poly(ethylene terephthalate) is carried out in a 15-pound batch reactor to obtain green polymer for flowing into 2-liter bottles. The following compounds are charged into the 15-pound batch reactor:
15 pounds dimethyl terephthalate;
14.5 pounds ethylene glycol;
0.4 g (59 ppm)

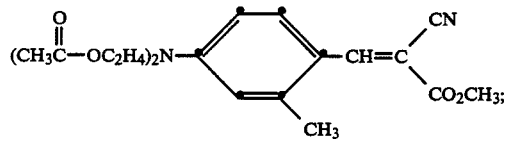

0.445 g (66 ppm) phthalocyanine blue pigment; and
21 mL of a n-butanol solution of acetyl triisopropyl titanate (90 ppm titanium)

The following progressive heating schedule is then used to obtain ester interchange and polycondensation:
3 hr at 190° C. in nitrogen atmosphere with stirring;
2.5 hr at 210° C. in nitrogen atmosphere with stirring;
0.5 hr at 280° C. in nitrogen atmosphere with stirring; and
1.25 hr at 280° C. under vacuum of 0.5 to 0.8 mm Hg with stirring.

The polymer is forced out the bottom of the reactor into water, separated therefrom and then ground through a Wiley Mill to pass a 3 mm screen. The polymer is green colored and has an inherent viscosity of 0.594. The polymer granules are built up further in inherent viscosity in the solid state in a fluidized bed using nitrogen as the fluidizer gas and hot oil as the heat source to heat the fluidizer. The fluidizer is heated to yield a 215° C. polymer temperature, held at 215° C. for 5 minutes, and then is allowed to cool. The resulting polymer has an inherent viscosity of 0.723. The amorphous polymer is molded at 277° C. into 2-liter parisons using the New Britain molding machine. The parisons are successfully blow molded into 2-liter bottles having a green color.

EXAMPLE 761

Preparation of Amber Polyester for Blowing Into Bottles

A synthesis of poly(ethylene terephthalate) is carried out in a 15-pound batch reactor to obtain amber polymer for blowing into 2-liter bottles. The following compounds are charged into the 15-pound reactor:
15 pounds dimethyl terephthalate;
14.5 pounds ethylene glycol;
3.26 g (484 ppm)

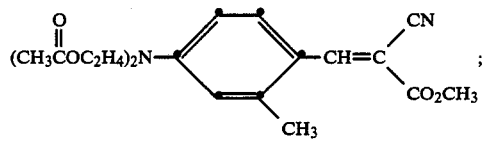

1.52 g (225 ppm)

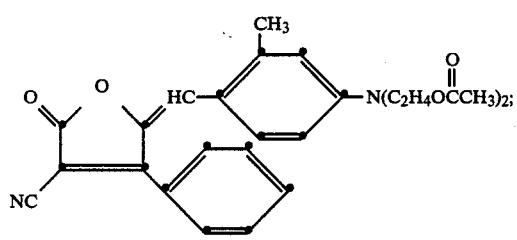

0.32 g (47 ppm) phthalocyanine blue; and
21 mL of a n-butanol solution of acetyl triisopropyl titanate (90 ppm titanium).

The ester interchange, melt-phase polycondensation, and solid-state polycondensation are carried out as in Example 760. The resulting polymer has an inherent viscosity of 0.728. The amorphous polymer is molded at 277° C. into 2-liter parisons using the New Britain molding machine, and the parisons are successfully blow molded into amber-colored 2-liter bottles.

This invention has been described in detail with particular reference to preferred embodiments thereof, but it will be understood that variations and modifications can be effected within the spirit and scope of the invention.

We claim:

1. A composition comprising molding or fiber grade condensation polymer having copolymerized therein a total of from 1.0 to about 5,000 ppm of at least one reactive compound selected from those of the formulae

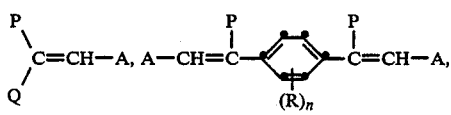

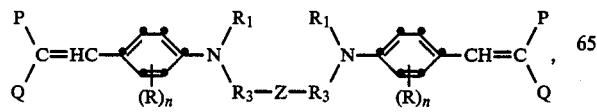

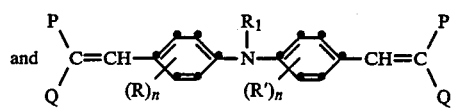

wherein each A is selected from the following radicals:

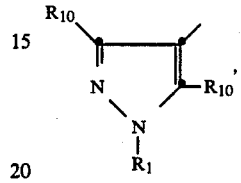

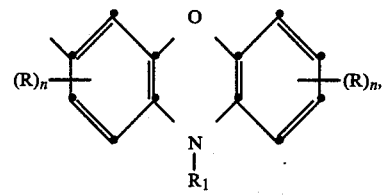

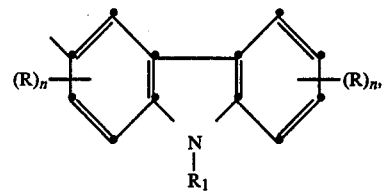

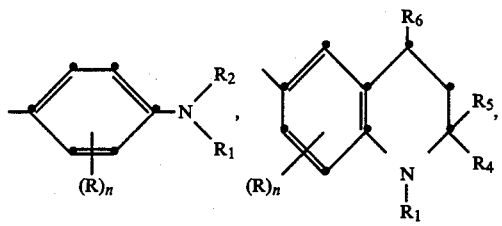

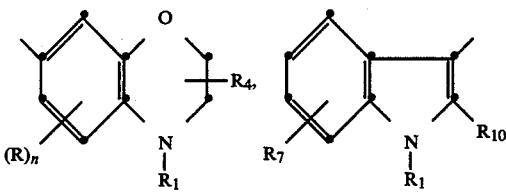

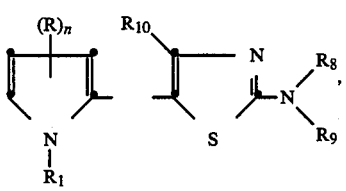

-continued

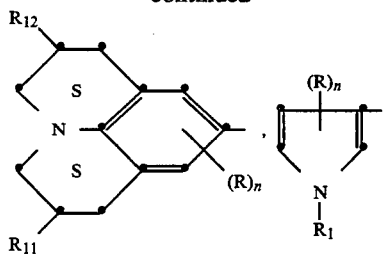

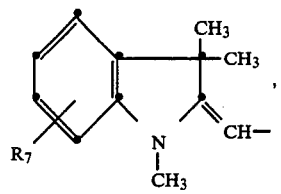

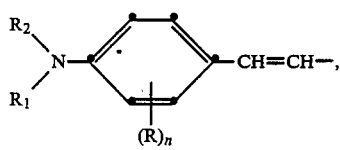

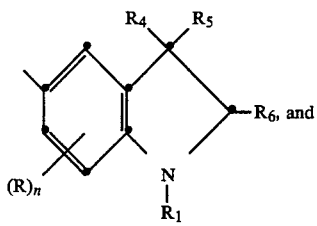

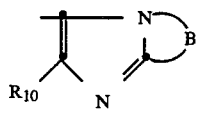

wherein:
R and R' are selected from hydrogen, fluorine, chlorine, bromine, alkyl, alkoxy, phenyl, phenoxy, alkylthio, and arylthio; n is 0, 1, 2;
$R_1$ and $R_2$ are selected from hydrogen; cycloalkyl; cycloalkyl substituted with one or two of alkyl, —OH, alkoxy, halogen, or hydroxy substituted alkyl; phenyl; phenyl substituted with alkyl, alkoxy, halogen, alkanoylamino, carboxy, cyano, or alkoxycarbonyl; straight or branched lower alkenyl; straight or branched alkyl of 1-8 carbons and such alkyl substituted with the following: hydroxy; halogen; cyano; succinimido; hydroxysuccinimido; acyloxysuccinimido; glutarimido; phenylcarbamoyloxy; phthalimido; 4-carboxyphthalimido; phthalimidino; 2-pyrrolidono; cyclohexyl; phenyl; phenyl substituted with alkyl, alkoxy, halogen, hydroxy alkanoylamino, carboxy, cyano, or alkoxycarbonyl; alkylsulfamoyl; vinylsulfonyl; acrylamido; sulfamyl; benzoylsulfonicimido; alkylsulfonamido; phenylsulfonamido; alkoxycarbonylamino; alkylcarbamoyloxy; alkoxycarbonyl; alkoxycarbonyloxy; alkenylcarbonylamino; groups of the formula

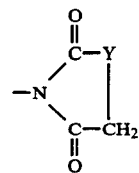

wherein Y is —NH—,

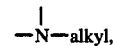

—O—, —S—, or —$CH_2O$—; —S—$R_{14}$; $SO_2CH_2CH_2SR_{14}$; wherein $R_{14}$ is alkyl, phenyl, phenyl substituted with halogen, alkyl, alkoxy, alkanoylamino, cyano, or alkoxycarbonyl; pyridyl; pyrimidinyl; benzoxazolyl; benzimidazolyl; benzothiazolyl; radicals of the formulae

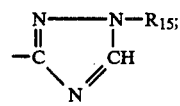

—$OXR_{16}$; —$NHXR_{16}$; —X—$R_{16}$; —$CONR_{15}R_{15}$; and —$SO_2NR_{15}R_{15}$; wherein $R_{15}$ is selected from H, aryl, alkyl, and alkyl substituted with halogen, —OH, phenoxy, aryl, —CN, cycloalkyl, alkylsulfonyl, alkylthio, alkanoyloxy, or alkoxy; X is —CO—, —COO—, or —$SO_2$—; $R_{16}$ is selected from alkyl and alkyl substituted with halogen, hydroxy, phenoxy, aryl, cyano, cycloalkyl, alkylsulfonyl, alkylthio, alkanoyloxy, and alkoxy; and when X is —CO—, $R_{16}$ also can be hydrogen, amino, alkenyl, alkylamino, dialkylamino, arylamino, aryl, or furyl; alkoxy; alkoxy substituted with hydroxy, cyano, alkanoyloxy, or alkoxy; phenoxy; phenoxy substituted with one or more of alkyl, carboxy, alkoxy, carbalkoxy, or halogen; $R_1$ and $R_2$ can be a single combined group such as pentamethylene, tetramethylene, ethyleneoxyethylene, ethylene sulfonylethylene, or

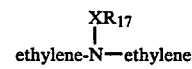

which, with the nitrogen to which it is attached, forms a ring; $R_{17}$ is alkyl, aryl, or cycloalkyl;
$R_3$ is alkylene, arylene, aralkylene, alkyleneoxy, or alkyleneoxyalkylene;
Z is a direct single bond, OCO, O, S, $SO_2$, $R_{17}SO_2N=$,

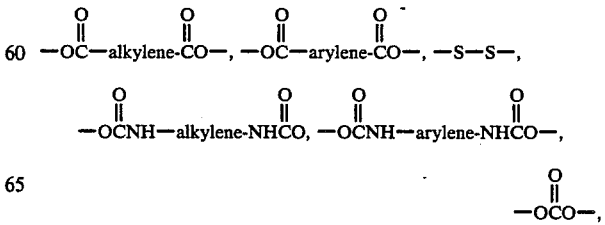

arylene, or alkylene;

R4, R5, and R6 are each selected from hydrogen and alkyl;

R7 is carboxy, carbalkoxy, or $(R)_n$;

R10 is hydrogen, alkyl, and aryl;

R8 and R9 are each selected from hydrogen and substituted or unsubstituted alkyl, aryl, or cycloalkyl;

R11 and R12 are each selected from hydrogen, alkyl, hydroxyl, or acyloxy;

B represents the atoms necessary to complete a five or six membered ring and is selected from

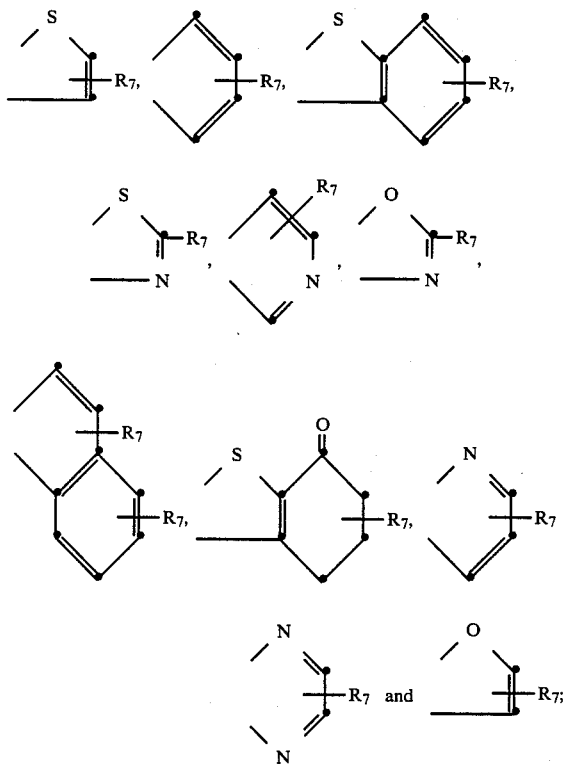

each P and Q are selected from cyano, carbalkoxy, carbaryloxy, carbaralkyloxy, carbamyl, carboxy, N-alkylcarbamyl, N-alkyl-N-arylcarbamyl, N,N-dialkylcarbamyl, N-arylcarbamyl, N-cyclohexylcarbamyl, aryl, 2-benzoxazolyl, 2-benzothiazolyl, 2-benzimidazolyl, 1,3,4-thiadiazol-2-yl, 1,3,4-oxadiazol-2-yl, $SO_2$ alkyl, $SO_2$ aryl, and acyl, or P and Q may be combined as

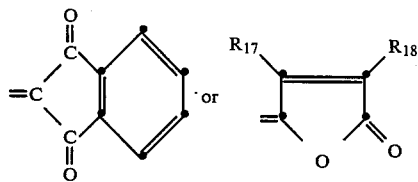

wherein $R_{17}$ is defined above and $R_{18}$ is CN, COOH, $CO_2$ alkyl, carbamyl, or N-alkylcarbamyl;

wherein at least one of A, P, and Q for each dye molecule must be or bear a condensable group selected from carboxy, carbalkoxy, carbaryloxy, N-alkylcarbamyloxy, acyloxy, chlorocarbonyl, carbamyloxy, N-(alkyl)2carbamyloxy, amino, alkylamino, hydroxyl, N-phenylcarbamyloxy, cyclohexanoyloxy, and carbocyclohexyloxy; and wherein in the above definitions, each alkyl, aryl, or cycloalkyl moiety or portion of a group or radical may be substituted where appropriate with hydroxyl, acyloxy, alkyl, cyano, alkoxycarbonyl, halogen, alkoxy, or aryl, aryloxy, or cycloalkyl; said compounds having one or more methine units, absorbing in the range of from about 350 nm to about 650 nm, are nonextractable from said polymer and are stable under the polymer processing conditions.

2. The composition of claim 1 wherein the polymer is linear, thermoplastic, and has an I.V. of about 0.4 to about 1.2.

3. The composition of claim 2 wherein the polymer is polyester in which the acid moiety comprises at least 50 mol % terephthalic acid residue, and the diol moiety comprises at least 50 mol % ethylene glycol or 1,4-cyclohexanedimethanol residue, or mixtures thereof.

4. The composition of claim 2 wherein the polymer is polyester in which the diol moiety is the residue of one or more of ethylene glycol, 1,4-cyclohexanedimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-cyclohexanedimethanol, 1,3-cyclohexanedimethanol, X,8-bis(hydroxymethyl)tricyclo[5.2.1.0]-decane wherein X represents 3, 4, or 5, diethylene glycol, triethylene glycol, dipropylene glycol, or tripropylene glycol, and in which the acid moiety is the residue of one or more acids selected from terephthalic, isophthalic, 1,4-cyclohexanedicarboxylic, 1,3-cyclohexanedicarboxylic, succinic, glutaric, adipic acid, or 1,12-dodecanedioic.

5. The composition of claim 1 wherein the reactive compound has the formula

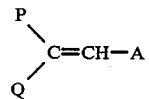

6. The composition of claim 5 wherein A has the formula

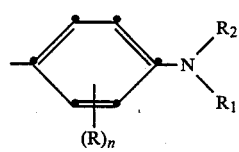

7. The composition of claim 6 wherein:

R is H, alkyl, halogen or alkoxy; and $R_1$ and $R_2$ are each selected from H, alkyl, cycloalkyl, cycloalkyl substituted with one or more of alkyl, OH, CN, alkoxy, carbalkoxy or alkanoyloxy, and alkyl substituted with one or more of OH, CN, alkanoyloxy, carbalkoxy, aryl, substituted aryl, alkoxy, alkoxyalkoxy, halogen, succinimido or carbamyl.

8. The composition of claim 1 wherein A has the formula

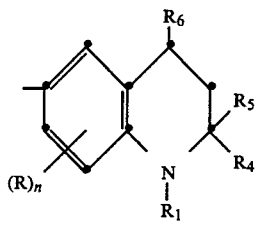

9. The composition of claim 8 wherein:
R is H, alkyl, halogen or alkoxy;
$R_1$ is selected from H, alkyl, cycloalkyl, cycloalkyl substituted with one or more of alkyl, OH, CN, alkoxy, carbalkoxy or alkanoyloxy, and alkyl substituted with one or more of OH, CN, alkanoyloxy, carbalkoxy, aryl, substituted aryl, alkoxy, alkoxyalkoxy, halogen, succinimido or carbamyl; and
$R_4$, $R_5$ and $R_6$ are each H or alkyl.

10. The composition of claim 1 wherein A has the formula

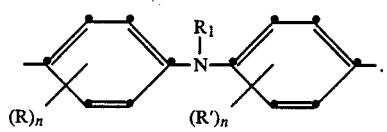

11. The composition of claim 10 wherein
R and R' are each selected from H, alkyl, halogen and alkoxy; and
$R_1$ is H, alkyl, cycloalkyl, cycloalkyl substituted with one or more of alkyl, OH, CN, alkoxy, carbalkoxy or alkanoyloxy, and alkyl substituted with one or more of OH, CN, alkanoyloxy, carbalkoxy, aryl, substituted aryl, alkoxy, alkoxyalkoxy, halogen, succinimido or carbamyl.

12. The composition of claim 1 wherein the reactive compound has the formula

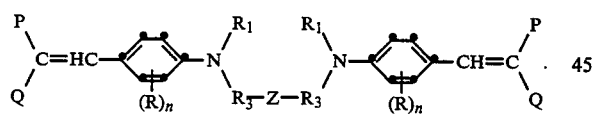

13. The composition of claim 12 wherein
each R is H, alkyl, halogen or alkoxy;
each $R_1$ is H, alkyl, cycloalkyl, cycloalkyl substituted with one or more of alkyl, OH, CN, alkoxy, carbalkoxy or alkanoyloxy, and alkyl substituted with one or more of OH, CN, alkanoyloxy, carbalkoxy, aryl, substituted aryl, alkoxy, alkoxyalkoxy, halogen, succinimido or carbamyl; and
Z is a direct bond, O, S, $SO_2$,

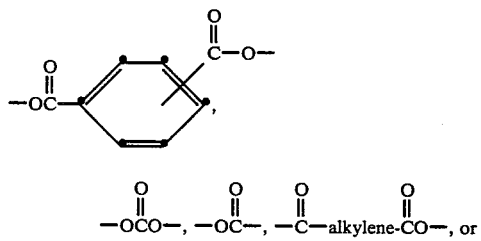

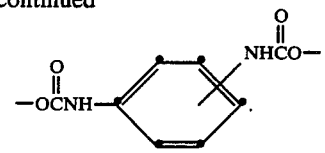

14. The composition of any of claims 1–4 wherein the condensable group is one or more of carboxy, carbalkoxy or hydroxy.

15. The composition of any of claims 1–4 wherein the reactive compound is

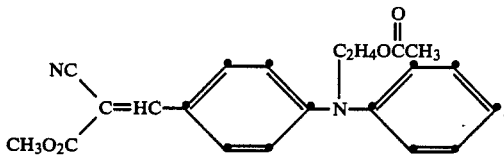

16. The composition of any of claims 1–4 wherein the reactive compound is

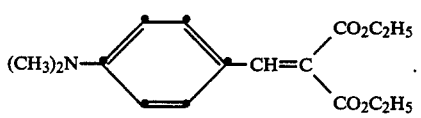

17. The composition of any of claims 1–4 wherein the reactive compound is

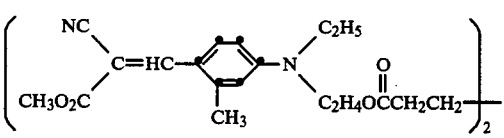

18. The composition of any of claims 1–4 wherein the reactive compound is

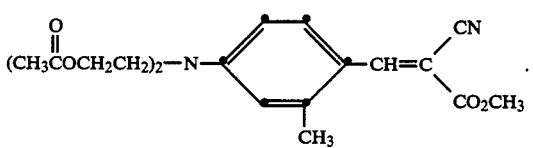

19. The composition of any of claims 1–4 wherein the reactive compound is

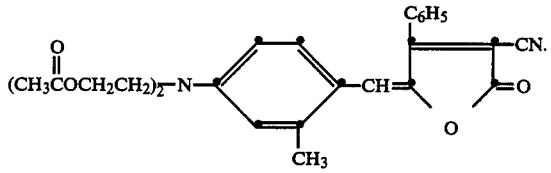

20. The composition of any of claims 1–4 wherein the reactive compound is

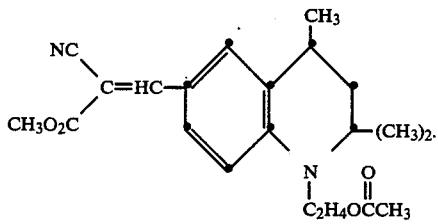

* * * * *